United States Patent
Long et al.

(10) Patent No.: US 9,541,191 B2
(45) Date of Patent: Jan. 10, 2017

(54) DUAL PUMP REGULATOR SYSTEM FOR A MOTOR VEHICLE TRANSMISSION

(71) Applicant: Allison Transmission, Inc., Indianapolis, IN (US)

(72) Inventors: Charles F. Long, Pittsboro, IN (US); Darren J. Weber, Indianapolis, IN (US); John W. E. Fuller, Preston (GB)

(73) Assignee: Allison Transmission, Inc., Indianapolis, IN (US)

( * ) Notice: Subject to any disclaimer, the term of this patent is extended or adjusted under 35 U.S.C. 154(b) by 35 days.

(21) Appl. No.: 14/282,684

(22) Filed: May 20, 2014

(65) Prior Publication Data
US 2014/0257649 A1    Sep. 11, 2014

Related U.S. Application Data

(63) Continuation of application No. 13/325,412, filed on Dec. 14, 2011, now Pat. No. 8,727,942.
(Continued)

(51) Int. Cl.
*F16H 61/00*     (2006.01)
*F16H 61/664*   (2006.01)
(Continued)

(52) U.S. Cl.
CPC .......... *F16H 61/0025* (2013.01); *F16H 15/50* (2013.01); *F16H 57/0446* (2013.01);
(Continued)

(58) Field of Classification Search
USPC .................................. 477/61, 98; 475/49, 83
See application file for complete search history.

(56) References Cited

U.S. PATENT DOCUMENTS

| 4,514,147 A | 4/1985 | Borman et al. |
| 4,709,596 A | 12/1987 | Boda et al. |

(Continued)

FOREIGN PATENT DOCUMENTS

| CN | 1875189 A | 12/2006 |
| CN | 102890902 A | 1/2013 |

(Continued)

OTHER PUBLICATIONS

Torotrak Full toroidal variator (http://www.torotrak.com/IVT/works/variator.htm) 5 pages (accessed Sep. 24, 2009).
(Continued)

*Primary Examiner* — Edwin A Young
(74) *Attorney, Agent, or Firm* — Barnes & Thornburg LLP

(57) ABSTRACT

An apparatus and method are disclosed for controlling fluid flow in a motor vehicle transmission. At least one friction engagement device is fluidly coupled to a first pump, and a lubrication and cooling sub-system is normally fluidly coupled to a second pump. Illustratively, when a flow rate of the fluid in the first fluid passageway is less than a threshold fluid flow rate, a temperature of the fluid is greater than a temperature threshold and a fluid flow demand is greater than a fluid flow demand threshold, fluid flow from the second pump to the lubrication and cooling sub-system is blocked and fluid supplied by the second pump is instead directed to the at least one friction engagement device such that fluid is supplied by both the first and second pumps only to the at least one friction engagement device.

20 Claims, 7 Drawing Sheets

Related U.S. Application Data

(60) Provisional application No. 61/423,296, filed on Dec. 15, 2010.

(51) Int. Cl.
  *F16H 15/50* (2006.01)
  *F16H 57/04* (2010.01)

(52) U.S. Cl.
  CPC ..... *F16H 61/0021* (2013.01); *F16H 61/6649* (2013.01); *F16H 2061/0037* (2013.01); *Y10T 137/7737* (2015.04); *Y10T 477/653* (2015.01)

(56) References Cited

U.S. PATENT DOCUMENTS

| | | |
|---|---|---|
| 4,838,126 A | 6/1989 | Wilfinger et al. |
| 4,922,788 A | 5/1990 | Greenwood |
| 5,090,951 A | 2/1992 | Greenwood |
| 5,217,418 A | 6/1993 | Fellows et al. |
| 5,232,414 A | 8/1993 | Fellows et al. |
| 5,242,337 A | 9/1993 | Greenwood |
| 5,263,907 A | 11/1993 | Fellows |
| 5,308,297 A | 5/1994 | Greenwood |
| 5,308,298 A | 5/1994 | Lambert |
| 5,316,526 A | 5/1994 | Fellows |
| 5,338,268 A | 8/1994 | Greenwood |
| 5,395,292 A | 3/1995 | Fellows et al. |
| 5,401,221 A | 3/1995 | Fellows et al. |
| 5,423,727 A | 6/1995 | Fellows |
| 5,453,061 A | 9/1995 | Fellows |
| 5,521,819 A | 5/1996 | Greenwood |
| 5,564,993 A | 10/1996 | Robinson |
| 5,564,998 A | 10/1996 | Fellows |
| 5,643,121 A | 7/1997 | Greenwood et al. |
| 5,667,456 A | 9/1997 | Fellows |
| 5,700,226 A | 12/1997 | Droste |
| 5,766,105 A | 6/1998 | Fellows et al. |
| 5,820,508 A | 10/1998 | Konig et al. |
| 5,820,513 A | 10/1998 | Greenwood |
| 5,895,337 A | 4/1999 | Fellows et al. |
| 5,938,557 A | 8/1999 | Greenwood |
| 5,971,885 A | 10/1999 | Greenwood et al. |
| 6,030,310 A | 2/2000 | Greenwood et al. |
| 6,066,067 A | 5/2000 | Greenwood |
| 6,071,209 A | 6/2000 | Greenwood |
| 6,273,839 B1 | 8/2001 | Dutson |
| 6,292,732 B1 | 9/2001 | Steinmetz et al. |
| 6,306,060 B1 | 10/2001 | Dutson et al. |
| 6,312,356 B1 | 11/2001 | Greenwood |
| 6,364,811 B1 | 4/2002 | Hubbard et al. |
| 6,464,614 B2 | 10/2002 | Dutson |
| 6,626,793 B1 | 9/2003 | Greenwood |
| 6,666,791 B1 | 12/2003 | Greenwood |
| 6,932,736 B2 | 8/2005 | Yamamoto |
| 6,979,276 B2 | 12/2005 | Murray |
| 7,018,320 B2 | 3/2006 | Robinson et al. |
| 7,056,261 B2 | 6/2006 | Fuller |
| 7,160,226 B2 | 1/2007 | Fuller |
| 7,278,951 B2 | 10/2007 | Fuller |
| 7,318,786 B2 | 1/2008 | Greenwood et al. |
| 7,407,459 B2 | 8/2008 | Greenwood et al. |
| 7,491,149 B2 | 2/2009 | Greenwood et al. |
| 7,530,916 B2 | 5/2009 | Greenwood |
| 7,563,194 B2 | 7/2009 | Murray |
| 7,614,973 B2 | 11/2009 | Parthuisot |
| 7,625,309 B2 | 12/2009 | Fuller |
| 7,632,208 B2 | 12/2009 | Greenwood et al. |
| 7,637,841 B2 | 12/2009 | Dutson |
| 7,951,041 B2 | 5/2011 | Dutson |
| 7,955,210 B2 | 6/2011 | Greenwood et al. |
| 8,727,942 B2 * | 5/2014 | Long .................. F16H 61/0025 477/98 |
| 2001/0041642 A1 | 11/2001 | Miyata |
| 2004/0038773 A1 | 2/2004 | Robinson et al. |
| 2004/0112171 A1 | 6/2004 | Kuhstrebe et al. |
| 2005/0043138 A1 | 2/2005 | Fuller |
| 2005/0143216 A1 | 6/2005 | Greenwood et al. |
| 2005/0176547 A1 | 8/2005 | DeFreitas |
| 2005/0211295 A1 | 9/2005 | Long et al. |
| 2006/0037422 A1 | 2/2006 | Kuhstrebe et al. |
| 2006/0142110 A1 | 6/2006 | Greenwood et al. |
| 2006/0160656 A1 | 7/2006 | Dutson |
| 2006/0184303 A1 | 8/2006 | Long et al. |
| 2006/0201766 A1 | 9/2006 | Fuller |
| 2007/0072736 A1 | 3/2007 | DeFreitas et al. |
| 2007/0112495 A1 | 5/2007 | Murray |
| 2007/0142163 A1 | 6/2007 | Murray |
| 2007/0275817 A1 | 11/2007 | Newall |
| 2008/0085801 A1 | 4/2008 | Sedoni et al. |
| 2008/0146399 A1 | 6/2008 | Oliver et al. |
| 2008/0153659 A1 | 6/2008 | Greenwood |
| 2008/0176709 A1 | 7/2008 | Wu et al. |
| 2008/0269001 A1 | 10/2008 | Greenwood et al. |
| 2009/0048054 A1 | 2/2009 | Tsuchiya et al. |
| 2009/0062065 A1 | 3/2009 | Field et al. |
| 2009/0075772 A1 | 3/2009 | Ellis et al. |
| 2009/0203486 A1 | 8/2009 | Murray |
| 2009/0253552 A1 | 10/2009 | Foster |
| 2009/0280954 A1 | 11/2009 | Ames et al. |
| 2009/0305840 A1 | 12/2009 | Oliver |
| 2011/0130237 A1 | 6/2011 | Long et al. |
| 2011/0138898 A1 | 6/2011 | Long et al. |
| 2011/0140017 A1 | 6/2011 | Long et al. |
| 2011/0143882 A1 | 6/2011 | Long et al. |
| 2011/0144872 A1 | 6/2011 | Long et al. |
| 2011/0144925 A1 | 6/2011 | Long et al. |
| 2011/0152031 A1 | 6/2011 | Schoolcraft |
| 2012/0011841 A1 | 1/2012 | Ogata et al. |

FOREIGN PATENT DOCUMENTS

| | | |
|---|---|---|
| EP | 1316743 A2 | 6/2003 |
| GB | 2361510 A | 10/2001 |
| GB | 2368618 A | 5/2002 |
| GB | 2384531 A | 7/2003 |
| GB | 2397630 A | 7/2004 |
| GB | 2410302 A | 7/2005 |
| GB | 2418235 A | 3/2006 |
| GB | 2438412 A | 11/2007 |
| GB | 2440746 A | 2/2008 |
| GB | 2455030 A | 6/2009 |
| GB | 2459857 A | 11/2009 |
| GB | 2460237 A | 11/2009 |
| GB | 2470717 A | 12/2010 |
| GB | 2474870 A | 5/2011 |
| JP | 2005221047 A | 8/2005 |
| JP | 2010249300 A | 11/2010 |
| WO | 9740292 A1 | 10/1997 |
| WO | 2010131345 | 11/2010 |

OTHER PUBLICATIONS

International Search Report and the Written Opinion for International Application No. PCT/US11/64815, dated Apr. 19, 2012 (11 pages).
U.S. Appl. No. 13/325,372, filed Dec. 14, 2011; Long et al.
U.S. Appl. No. 61/423,297, filed Dec. 15, 2010, Long et al., 41 pages.
U.S. Appl. No. 61/287,031, filed Dec. 16, 2009, Long et al., 39 pages.
U.S. Appl. No. 61/287,038, filed Dec. 16, 2009, Long et al., 33 pages.
U.S. Appl. No. 61/423,293, filed Dec. 15, 2010, Long et al., 47 pages.
U.S. Appl. No. 61/287,020, filed Dec. 16, 2009, Schoolcraft, 34 pages.
International Preliminary Report on Patentability for Application No. PCT/US2011/064815, issued Jun. 18, 2013, 9 pages.
Patent Examination Report No. 1 from the Australian Government for Application No. 2011343889, issued Oct. 14, 2015, 3 pages.
European Search Report and Written Opinion for Application No. 11849272.7, dated Jun. 3, 2016.

(56) References Cited

OTHER PUBLICATIONS

Office Action for the People's Republic of China for Application No. 201180067564.1, dated May 5, 2015, 22 pages.

* cited by examiner

DUAL PUMP REGULATOR SYSTEM FOR A MOTOR VEHICLE TRANSMISSION

CROSS-REFERENCE TO RELATED APPLICATIONS

This application is a continuation application of U.S. application Ser. No. 13/325,412 entitled "DUAL PUMP REGULATOR SYSTEM FOR A MOTOR VEHICLE TRANSMISSION," which was filed on Dec. 14, 2011, and which claims priority under 35 U.S.C. §119(e) to U.S. Provisional Application Ser. No. 61/423,296, filed Dec. 15, 2010, the entirety of each of which is herein incorporated by reference.

TECHNICAL FIELD

The present invention relates generally to motor vehicle transmissions, and more specifically to systems and methods for controlling the pressure and flow of fluids in such transmissions.

BACKGROUND

Conventional transmission fluid supply systems in motor vehicle transmission may include one or more fluid pumps that supply the transmission fluid to various components and sub-systems of the transmission. In transmissions which include two or more such fluid pumps, it is desirable to control the pressure and/or flow of fluids supplied by such pumps to satisfy fluid flow demands during various fluid pressure, temperature and/or flow conditions.

SUMMARY

The present application discloses one or more of the features recited in the appended claims and/or the following features which alone or in any combination, may comprise patentable subject matter.

The present invention may comprise one or more of the features recited in the attached claims, and/or one or more of the following features and combinations thereof. An apparatus for controlling fluid flow in a motor vehicle transmission may comprise a first pump driven by an input shaft of the transmission to supply fluid from a source of fluid to at least one friction engagement device via a first fluid passageway, a second pump driven by the input shaft of the transmission to normally supply fluid from the source of fluid to a lubrication and cooling sub-system of the transmission via a second fluid passageway, a first valve fluidly coupled between the first and second fluid passageways and directing fluid from the second fluid passageway to the first fluid passageway when fluid pressure in the second fluid passageway is greater than fluid pressure in the first fluid passageway by at least a threshold pressure amount, and a second valve fluidly coupled to the first and second fluid passageways and to the lubrication and cooling sub-system. The second valve may block the first and second fluid passageways from the lubrication and cooling sub-system when a flow rate of the fluid in the first fluid passageway is less than a first threshold fluid flow rate, a temperature of the fluid is greater than a temperature threshold and a fluid flow demand is greater than a fluid flow demand threshold such that fluid pressure in the second fluid passageway exceeds the fluid pressure in the first fluid passageway by at least the threshold pressure amount. Fluid may thus be supplied by the first and second pumps only to the at least one friction engagement device via the first fluid passageway.

The first valve may comprise a ball check valve configured to allow fluid flow from the second fluid passageway to the first fluid passageway when the fluid pressure in the second fluid passageway is greater than the fluid pressure in the first fluid passageway by at least the threshold pressure amount and to otherwise block fluid flow between the first and second fluid passageways.

The second valve may comprise a spool having one end in fluid communication with the first fluid passageway and an opposite end positioned in a spring pocket under bias of a spring in the direction of the one end, the spring pocket receiving fluid at a controlled pressure. A position of the spool within the second valve may be a function of the fluid pressure in the first passageway, the controlled pressure of the fluid in the spring pocket and a biasing force of the spring. The apparatus may further comprise a trim valve having a fluid inlet fluidly coupled to the first fluid passageway and a fluid outlet fluidly coupled to the spring pocket of the second valve. The trim valve may be responsive to a control signal to supply fluid at the controlled pressure to the spring pocket of the second valve. The apparatus may further comprise a control circuit including a memory having instructions stored therein executable by the control circuit to produce the control signal. The apparatus may further comprise means for determining a rotational speed of the input shaft of the transmission. The memory may have an emergency low speed threshold stored therein that is correlated with the first threshold fluid flow rate, and the instructions stored in the memory may include instructions executable by the control circuit to determine whether the flow rate of the fluid in the first fluid passageway is less than a first threshold fluid flow rate by determining whether the rotational speed of the input shaft of the transmission is less than the emergency low speed threshold. The apparatus may further comprise means for determining a temperature of the fluid supplied by the first and second pumps and producing a corresponding temperature value. The temperature threshold and the fluid flow demand threshold may be stored in the memory, and the instructions stored in the memory may include instructions executable by the control circuit to determine the fluid flow demand and to produce the control signal if the rotational speed of the input shaft of the transmission is less than the emergency low speed threshold, the temperature value is greater than the threshold temperature and the fluid flow demand is greater than the fluid flow demand threshold.

The instructions stored in the memory may include instructions executable by the control circuit to modulate the control signal as a function of the fluid pressure in the first passageway and the biasing force of the spring such that the fluid pressure supplied by the trim valve to the spring pocket controls the spool to a position in which the second valve blocks the first and second fluid passageways from the lubrication and cooling sub-system such that fluid is supplied by the first and second pumps only to the at least one friction engagement device via the first fluid passageway.

The second valve may block the first fluid passageway from the lubrication and cooling sub-system and fluidly couple the second fluid passageway to the lubrication and cooling sub-system when the flow rate of the fluid in the first fluid passageway is greater than the first threshold fluid flow rate but less than a second threshold fluid flow rate and the temperature of the fluid is less than the temperature threshold such that the fluid pressure in the second fluid passage-way is less than the fluid pressure in the first fluid passageway by at least the threshold pressure amount. Fluid may thus be supplied by the first pump only to the at least one friction engagement device via the first fluid passageway and fluid may also be supplied by the second pump only to the lubrication and cooling sub-system via the second fluid passageway. The second valve may couple the first and second fluid passageways to the lubrication and cooling sub-system when the flow rate of the fluid in the first fluid passageway is greater than the second threshold fluid flow rate and the temperature of the fluid is greater than the temperature threshold such that the fluid pressure in the second fluid passageway is less than the fluid pressure in the first fluid passageway by at least the threshold pressure amount. Fluid may thus be supplied by the first pump to the at least one friction engagement device and to the lubrication and cooling system via the first fluid passageway and fluid may also be supplied by the second pump to the lubrication and cooling sub-system via the second fluid passageway. The second valve may comprise a spool having one end in fluid communication with the first fluid passageway and an opposite end positioned in a spring pocket under bias of a spring in the direction of the one end. A position of the spool within the second valve may be a function of the fluid pressure in the first passageway, fluid pressure in the spring pocket and a biasing force of the spring, and the second valve may regulate fluid pressure within the first fluid passageway to a fixed fluid pressure as a function of the biasing force of the spring and of an area of the one end of the spool when the spring pocket is exhausted. The apparatus may further comprise means for selectively exhausting the spring pocket of the second valve.

The transmission may further comprise another fluid-using sub-system in addition to the at least one friction engagement device and the lubrication and cooling subsystem. The another fluid-using subsystem fluidly may be coupled to the second valve via a third fluid passageway. The second valve may further block the first and second fluid passageways from the third fluid passageway when the flow rate of the fluid in the first fluid passageway is less than the first threshold fluid flow rate, the temperature of the fluid is greater than the temperature threshold and the fluid flow demand is greater than the fluid flow demand threshold. Fluid may flow to the another fluid-using sub-system via either of the first and second fluid pumps may thus be blocked. The second valve may block the first fluid passageway from the lubrication and cooling sub-system, fluidly couple the first fluid passageway to the third fluid passageway and block the second fluid passageway from the lubrication and cooling sub-system when the flow rate of the fluid in the first fluid passageway is greater than the first threshold fluid flow rate but less than a second threshold fluid flow rate, the temperature of the fluid is greater than the temperature threshold and the fluid flow demand is greater than the fluid flow demand threshold such that the fluid pressure in the second fluid passageway is less than the fluid pressure in the first fluid passageway by at least the threshold pressure amount. Fluid may thus be supplied by the first and second pumps only to the at least one friction engagement device and the another fluid-using sub-system via the first fluid passageway. The second valve may block the first fluid passageway from the lubrication and cooling sub-system, fluidly couple the first fluid passageway to the third fluid passageway and fluidly couple the second fluid passageway to the lubrication and cooling sub-system when the flow rate of the fluid in the first fluid passageway is greater than the second threshold fluid flow rate but less than a third threshold fluid flow rate and the temperature of the fluid is less than the temperature threshold such that the fluid pressure in the second fluid passageway is less than the fluid pressure in the first fluid passageway by at least the threshold pressure amount. Fluid may thus be supplied by the first pump only to the at least one friction engagement device and the another fluid-using sub-system via the first fluid passageway and fluid may be supplied by the second pump only to the lubrication and cooling sub-system via the second fluid passageway. The second valve may fluidly couple the first and second fluid passageways to the lubrication and cooling sub-system and fluidly couple the first fluid passageway to the third fluid passageway when the flow rate of the fluid in the first fluid passageway is greater than the third threshold fluid flow rate and the temperature of the fluid is greater than the temperature threshold such that the fluid pressure in the second fluid passageway is less than the fluid pressure in the first fluid passageway by at least the threshold pressure amount. Fluid may thus be supplied by the first pump to the at least one friction engagement device, the another fluid-using sub-system and the lubrication and cooling system via the first fluid passageway and fluid may be supplied by the second pump to the lubrication and cooling sub-system via the second fluid passageway.

The second valve may comprise a spool having one end in fluid communication with the first fluid passageway and an opposite end positioned in a spring pocket under bias of a spring in the direction of the one end. A position of the spool within the second valve may be a function of the fluid pressure in the first passageway, fluid pressure in the spring pocket and a biasing force of the spring, and the second valve may regulate fluid pressure within the first fluid passageway to a fixed fluid pressure as a function of the biasing force of the spring and of an area of the one end of the spool when the spring pocket is exhausted. The apparatus may further comprise means for selectively exhausting the spring pocket of the second valve. The another fluid-using sub-system may comprise one of a variator and a torque converter.

An apparatus for controlling fluid flow in a motor vehicle transmission including at least one friction engagement device and a fluid-using sub-system separate from and addition to the at least one friction engagement device may comprise a first pump driven by an input shaft of the transmission to supply fluid from a source of fluid to the at least one friction engagement device via a first fluid passageway and to normally supply fluid from the source of fluid to the fluid-using sub-system via the first fluid passageway, a second pump driven by the input shaft of the transmission to normally supply fluid from the source of fluid to a lubrication and cooling sub-system of the transmission via a second fluid passageway, a first valve fluidly coupled between the first and second fluid passageways and directing fluid from the second fluid passageway to the first fluid passageway when fluid pressure in the second fluid passageway is greater than fluid pressure in the first fluid passageway by at least a threshold pressure amount, and a second valve fluidly coupled to the first and second fluid passageways, to the fluid-using sub-system and to the lubrication and cooling sub-system. The second valve may block the first and second fluid passageways from the lubrication and cooling sub-system and fluidly coupling the first fluid passageway to the fluid-using sub-system when a flow rate of the fluid in the first fluid passageway is less than a first threshold fluid flow rate, a temperature of the fluid is greater than a temperature threshold and a fluid flow demand is greater than a fluid flow demand threshold such that fluid pressure in the second fluid passageway exceeds the fluid pressure in the first fluid passageway by at least the threshold pressure amount. Fluid may thus be supplied by the first and second pumps only to the at least one friction engagement device and to the fluid-using sub-system via the first fluid passageway. The another fluid-using sub-system may comprise one of a variator and a torque converter.

An apparatus for controlling fluid flow in a motor vehicle transmission including at least one friction engagement device, a fluid-using sub-system separate from and addition to the at least one friction engagement device and a lubrication and cooling sub-system may comprise a first pump driven by an input shaft of the transmission to supply fluid from a source of fluid to the at least one friction engagement device via a first fluid passageway, a second pump driven by the input shaft of the transmission to supply fluid from the source of fluid to a second fluid passageway, and a valve fluidly coupled to the first and second fluid passageways, to the fluid-using sub-system and to the lubrication and cooling sub-system. The valve may fluidly couple the first fluid passageway to the fluid-using sub-system and fluidly couple the second fluid passageway to the lubrication and cooling sub-system when a flow rate of the fluid in the first fluid passageway is greater than a threshold fluid flow rate and a temperature of the fluid is less than a temperature threshold. Fluid may thus be supplied only by the first pump to the at least one friction engagement device and to the fluid-using sub-system via the first fluid passageway and fluid may be supplied only by the second fluid pump to the lubrication and cooling sub-system via the second fluid passageway. The another fluid-using sub-system may comprise one of a variator and a torque converter.

An apparatus for controlling fluid flow in a motor vehicle transmission including at least one friction engagement device and a lubrication and cooling sub-system may comprise a first pump driven by an input shaft of the transmission to supply fluid from a source of fluid to the at least one friction engagement device via a first fluid passageway, a second pump driven by the input shaft of the transmission to supply fluid from the source of fluid to a second fluid passageway, and a valve fluidly coupled to the first and second fluid passageways and to the lubrication and cooling sub-system. The valve may fluidly couple the first fluid passageway to the lubrication and cooling sub-system when a flow rate of the fluid in the first fluid passageway is greater than a threshold fluid flow rate and a temperature of the fluid is greater than a temperature threshold. Fluid may thus be supplied by the first pump to the at least one friction engagement device and to the lubrication and cooling sub-system via the first fluid passageway and fluid may be supplied by the second fluid pump to the lubrication and cooling sub-system via the second fluid passageway. The another fluid-using sub-system may comprise one of a variator and a torque converter.

An apparatus for controlling fluid flow in a motor vehicle transmission including at least one friction engagement device may comprise a first pump driven by an input shaft of the transmission to supply fluid from a source of fluid to the at least one friction engagement device via a first fluid passageway, a valve including a spool having one end in fluid communication with the first fluid passageway and an opposite end positioned in a spring pocket under bias of a spring in the direction of the one end, and means for selectively supplying a modulated pressure to or exhausting the spring pocket of the valve. A position of the spool within the valve may be a function of the fluid pressure in the first passageway, fluid pressure in the spring pocket and a biasing force of the spring. The valve may regulate fluid pressure within the first fluid passageway as a function of the biasing force of the spring, the fluid pressure within the first fluid passageway and the modulated pressure when the modulated pressure is supplied to the spring pocket of the valve. The valve may also regulate fluid pressure within the first fluid passageway to a fixed fluid pressure as a function of the biasing force of the spring and of an area of the one end of the spool when the spring pocket is exhausted.

Additional features and advantages of the invention will become apparent to those skilled in the art upon consideration of the following detailed description of illustrated embodiments exemplifying the best mode of carrying out the invention as presently perceived.

DESCRIPTION OF THE DRAWINGS

The systems and methods described herein are illustrated by way of example and not by way of limitation in the accompanying figures. For simplicity and clarity of illustration, elements illustrated in the FIGS. are not necessarily drawn to scale. For example, the dimensions of some elements may be exaggerated relative to other elements for clarity. Further, where considered appropriate, reference labels have been repeated among the FIGS. to indicate corresponding or analogous elements.

DETAILED DESCRIPTION

Figure 1:
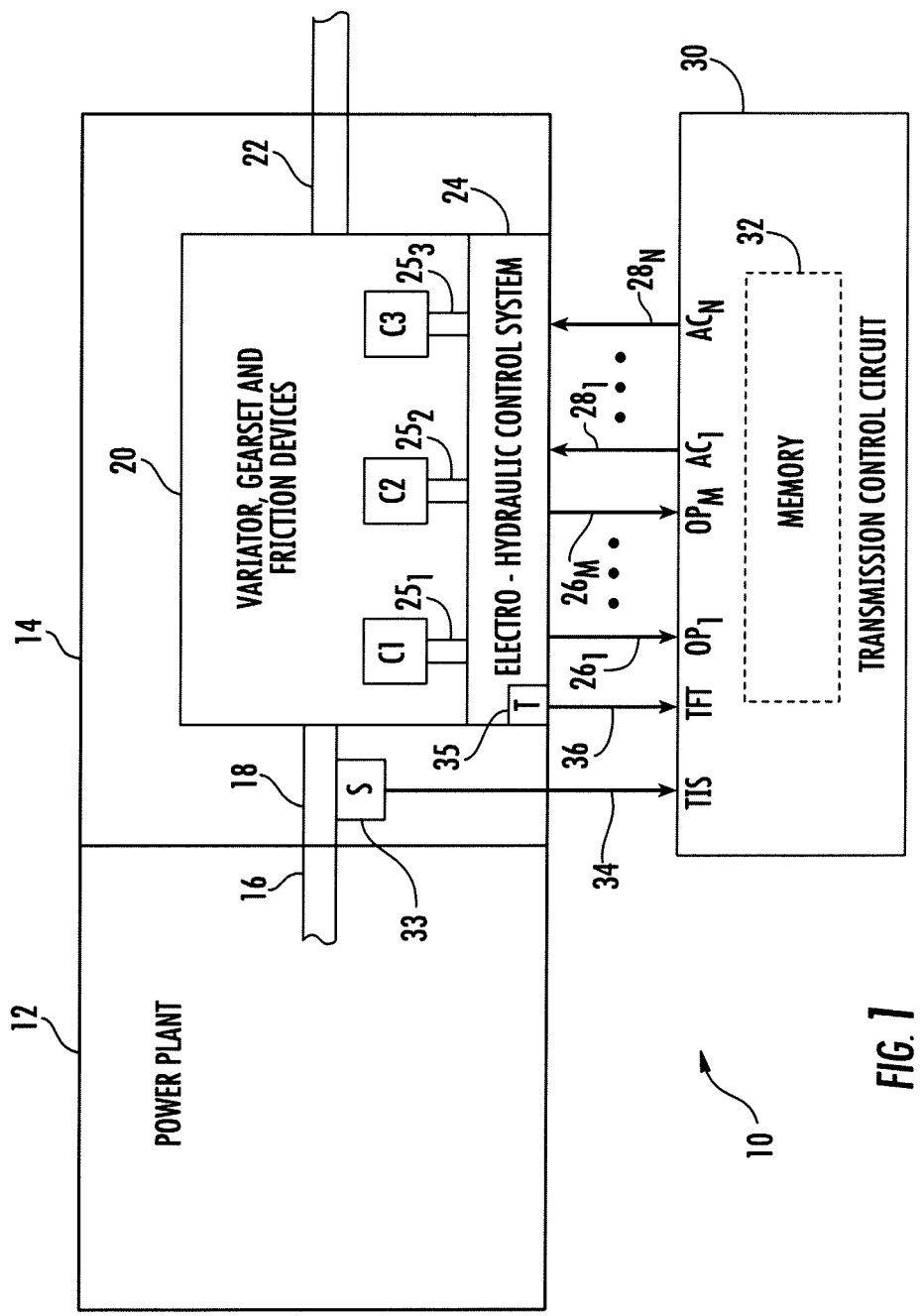
FIG. 1 is a block diagram of one illustrative embodiment of a system for controlling operation of a toroidal traction drive motor vehicle transmission.

For the purposes of promoting an understanding of the principles of the invention, reference will now be made to a number of illustrative embodiments shown in the attached drawings and specific language will be used to describe the same.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Referring now to FIG. 1, a block diagram is shown of one illustrative embodiment of a system 10 for controlling operation of a toroidal traction drive automatic transmission 14. In the illustrated embodiment, a power plant or energy center 12 is coupled to an automatic transmission 14 such that a rotatable output shaft 16 of the power plant 12 is coupled to a rotatable input shaft 18 of the transmission 14 in a conventional manner. The input shaft 18 is coupled, in the illustrated embodiment, to a combination variator and gear set 20 that further includes a plurality of selectively engageable friction devices, e.g., one or more conventional, selectively engageable clutches or the like, and an output of the combination variator and gear set 20 is coupled to a rotatable output shaft 22. The combination variator and gear set 20 is illustratively controlled by an electro-hydraulic control system 24, some of the details of which will be described in greater detail hereinafter.

The power plant 12 is generally an apparatus that produces rotational drive power at the output shaft 16. Examples of the power plant 12 include, but should not be limited to, one or any combination of a one or more engines, such as an internal combustion engine of the spark ignited, compression ignition or other variety, a steam engine, or type of engine that produces mechanical energy from one or more other fuel sources, one or more electrical generators, and the like.

Figure 2A:
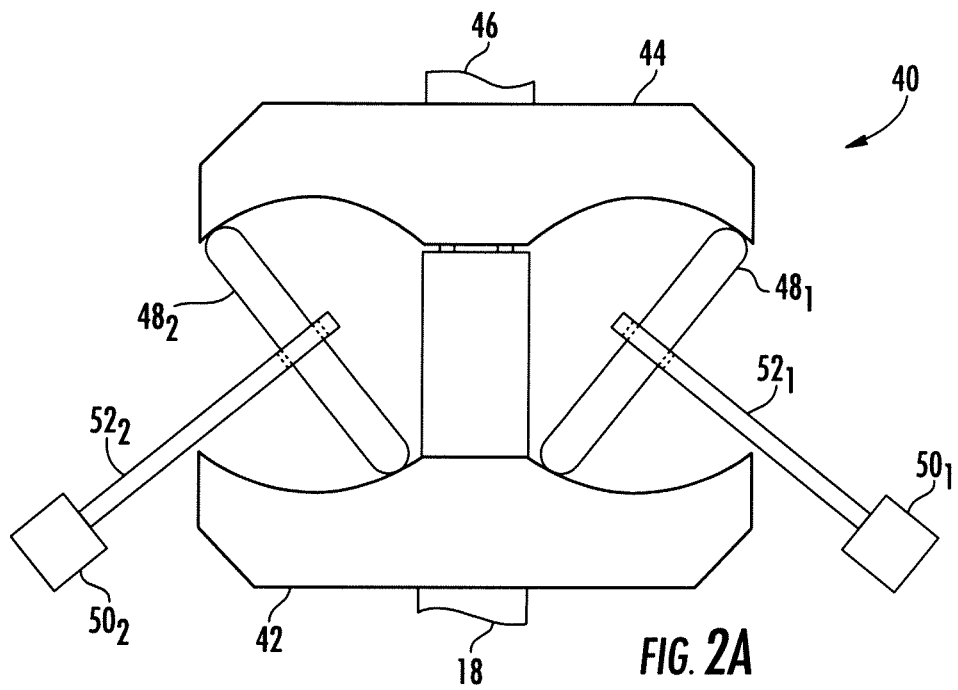
FIG. 2A is a diagram illustrating operation of one illustrative embodiment of a variator that forms part of the toroidal traction drive motor vehicle transmission illustrated in FIG. 1.
Figure 2B:
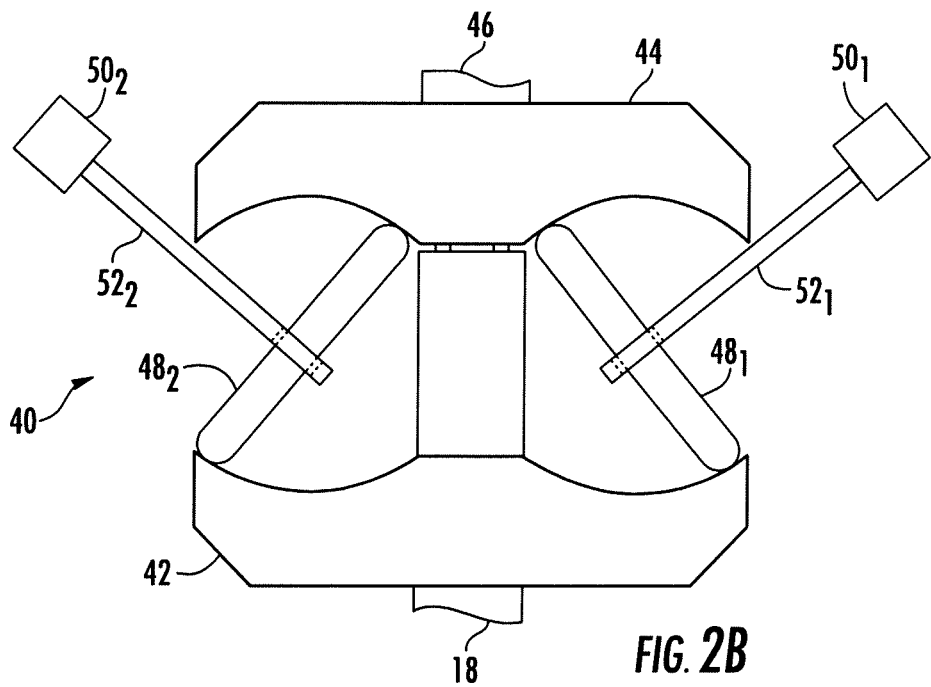
FIG. 2B is a diagram further illustrating operation of the variator of FIG. 2A.

The combination variator and gear set 20 illustratively includes a conventional full-toroidal, traction-drive variator that is coupled to a conventional gear set. Referring to FIGS. 2A and 2B, one illustrative embodiment of some of the structural features of such a full-toroidal, traction-drive variator 40 is shown. In the illustrated embodiment, the variator 40 includes a pair of opposing, toroidal-shaped disks 42 and 44 that rotate independently of each other. For example, the disk 42 is illustratively directly connected to the input shaft 18 of the transmission 14 such that the disk 42 is directly rotatably driven by the power plant 12. Alternatively, the disk 42 may be connected to the input shaft 18 of the transmission through one or more structures, e.g., one or more gear sets or other structures. For purposes of this disclosure, the term "coupled" used to described the relationship between the disk 42 and the input shaft 18 of the transmission is defined as either a direct connection, i.e., engagement, between the disk 42 and the input shaft 18 of the transmission 14 or an indirect connection between the disk 42 and the input shaft 18 of the transmission 14 through one or more structures interposed between the disk 42 and the input shaft 18 of the transmission 14. Illustratively, the disk 44 is rigidly coupled to an output shaft 46 of the variator 40, and is rotatably coupled to the shaft 18 such that the disk 44 rotates freely about the shaft 18. The output shaft 46 of the variator 40 is coupled directly, or indirectly through one or more transmission gears, to the output shaft 22 of the transmission 14 such that output shaft 46 of the variator 40 drives one or more wheels of a vehicle (not shown) carrying the power plant 12 and transmission 14.

A number of rollers 48 are illustratively positioned between opposing inner, arcuate-shaped surfaces, e.g., concave surfaces, of the disks 42 and 44, and a traction fluid (not shown) is disposed between the rolling surface of each such roller 48 and the inner surfaces of the disks 42 and 44. In the illustrated embodiment, the rolling surfaces of the various rollers 48 therefore do not contact, in a structural sense, the inner surface of either disk 42, 44; rather torque is transmitted by the various rollers 48 between the two disks 42, 44 via the traction fluid. It is because torque is transferred between the two disks 42, 44 via the traction fluid and not via structural contact between the rolling surfaces of the rollers 48 and the arcuate inner surfaces of the disks 42, 44 that the variator is referred to as a traction-drive apparatus.

In the embodiment illustrated in FIGS. 2A and 2B, two such rollers $48_1$ and $48_2$ are shown operatively positioned between the opposing inner surfaces of the two disks 42, 44. A roller actuator $50_1$, e.g., in the form of a conventional hydraulically actuated piston, is coupled to the roller $48_1$ via a bracket $52_1$, and another roller actuator $50_2$, e.g., in the form of another conventional hydraulically actuated piston, is coupled to the roller $48_2$ via a bracket $52_2$. It will be understood that the brackets $52_1$ and $52_2$ do not represent rotatable shafts about which the rollers $48_1$ and $48_2$ may be rotatably driven. Rather, the brackets $52_1$ and $52_2$ represent structures about which the rollers $48_1$ and $48_2$ rotate. In one actual implementation, for example, the brackets $52_1$ and $52_2$ are configured to attach to the central hub of the rollers $48_1$ and $48_2$ on either side thereof such that the brackets $52_1$ and $52_2$ and actuators $50_1$ and $50_2$ would extend generally perpendicular to the page illustrating FIGS. 2A and 2B.

The hydraulically controlled actuators $50_1$ and $50_2$ are each illustratively controllable by selectively controlling a high-side hydraulic pressure applied to one side of the actuators $50_1$ and $50_2$ and a low-side hydraulic pressure applied to the opposite side of the actuators $50_1$ and $50_2$. Traction force generated by the net hydraulic pressure, i.e., the difference between the applied high and low side hydraulic pressures, is transmitted by the rollers $48_1$ and $48_2$ to the two disks 42, 44 via the traction fluid, and this applied traction force defines the torque transmitted between the two disks 42, 44. Thus, a direct relationship exists between the net hydraulic pressure applied to the actuators $50_1$ and $50_2$ and the magnitude of the torque transmitted between the two disks 42, 44. Each roller $48_1$ and $48_2$ moves and precesses to the location and tilt angle relative to the disks 42, 44 required to transmit the torque to the disks 42, 44 defined by the net hydraulic pressure applied to the hydraulic actuators $50_1$ and $50_2$. A difference in the magnitude of the net hydraulic pressure applied to the actuators $50_1$ and $50_2$ changes the torque transmitted to the output shaft 46. The direction of the torque applied by the rollers $48_1$ and $48_2$ to the two disks 42, 44, is determined by the relative magnitudes of the high and low side pressures applied to the actuators $50_1$ and $50_2$. In one illustrative embodiment, for example, the rollers $48_1$ and $48_2$ apply a positive torque to the two disks 42, 44 if the high side hydraulic pressure is greater than the low side hydraulic pressure, and the rollers $48_1$ and $48_2$ conversely apply a negative torque to the two disks if the low side pressure is greater than the high side hydraulic pressure. In alternative embodiments, the rollers $48_1$ and $48_2$ may apply a positive torque to the two disks 42, 44 if the low side hydraulic pressure is greater than the high side hydraulic pressure, and the rollers $48_1$ and $48_2$ may conversely apply a negative torque to the two disks if the high side pressure is greater than the low side hydraulic pressure. In any case, the rollers $48_1$ and $48_2$ are free-castoring, and are responsive to the actuators $50_1$ and $50_2$ to seek a position that provides the correct ratio match of engine and drive train speeds based on input energy equaling output energy.

In one illustrative implementation, the variator 40 includes two sets or pairs of disks 42 and 44, with the pairs of the disks 42 rigidly coupled to each other and with the pairs of the disks 44 also rigidly coupled to each other, such that the embodiment illustrated in FIGS. 2A and 2B represents one-half of such an implementation. In this illustrative implementation, three rollers are positioned between each opposing set of disks 42, 44 for a total of six rollers $48_1$-$48_6$ and six corresponding hydraulically controlled actuators $50_1$-$50_6$. It will be understood, however, that this particular implementation of the variator 40 is shown and described only by way of example, and that other embodiments of the variator 40 that include more or fewer pairs of disks 42, 44, that include more or fewer rollers 48 and hydraulically controlled actuators 50, and/or that are configured to be only partially toroidal in shape, may alternatively be used. It will further be understood that while the operation of the variator 40 is illustrated and described herein as being generally hydraulically controlled, this disclosure contemplates embodiments in which operation of the variator 40 is controlled via purely electronic or electro-mechanical structures.

Referring again to FIG. 1, the gear set within the combination variator and gear set 20 illustratively includes one or more conventional planetary gear set(s) and/or other gear set(s) that define(s) at least two automatically selectable gear ratios and that is coupled to, or integrated with, the variator, e.g., the variator 40 illustrated and described with respect to FIG. 2. The combination variator and gear set 20 further illustratively includes a number of conventional friction devices, e.g., clutches, which may be selectively controlled to thereby control shifting of the transmission 14 between the two or more gear ratios. In alternate embodiments, the gear set may include more than one planetary gear set, one or more planetary gear sets in combination with one or more other conventional gear sets, or exclusively one or more non-planetary gear sets.

In the example embodiment illustrated in FIG. 1, the transmission 14 includes three friction devices, e.g., in the form of three conventional clutches C1, C2 and C3. In this embodiment, each clutch C1, C2 and C is operated in a conventional manner, e.g., via fluid pressure, under the control of the electro-hydraulic control system 24. In this regard, a fluid path $25_1$ is fluidly coupled between the electro-hydraulic control system 24 and the clutch C1, a fluid path $25_2$ is fluidly coupled between the electro-hydraulic control system 24 and the clutch C2, and a fluid path $25_3$ is fluidly coupled between the electro-hydraulic control system 24 and the clutch C3. The electro-hydraulic control system 24 is operable to control operation of the clutches C1-C3 by controlling fluid pressure within the fluid paths $25_1$-$25_3$ respectively.

The gear set and the clutches C1, C2 and C3 are illustratively arranged to provide four separate modes of operation of the transmission 14, and the various operating modes of the transmission 14 are selectively controlled by the operation of the clutches C1, C2 and C3. In a first operating mode, M1, for example, the clutch C1 is applied, e.g., engaged, while the clutches C2 and C3 are released, e.g., disengaged, and in this mode forward or reverse launch can be accomplished, and the vehicle carrying the transmission 14 can be operated at vehicle speeds up to about 10 miles per hour. In a second operating mode, M2, as another example, the clutch C2 is engaged while the clutches C1 and C3 are disengaged, and in this mode the vehicle can be operated at vehicle speeds in the range of about 10-30 miles per hour. In a third operating mode, M3, as yet another example, the clutch C3 is engaged while the clutches C1 and C2 are disengaged, and in this mode the vehicle can be operated at vehicle speeds greater than about 30 miles per hour. In a fourth mode, M0, as a final example, the clutches C1, C2 and C3 are all disengaged, and in this mode the transmission 14 is in neutral. Within each operating mode, torque applied to the output shaft 22 of the transmission 14 is controlled by the variator, e.g., the variator 40. In the transitional states between the various operating modes M1, M2 and M3, the variator torque is illustratively reversed to assist transitions from one operating mode to the next.

The system 10 further includes a transmission control circuit 30 that controls and manages the overall operation of the transmission 14. The transmission control circuit 30 includes a number, M, of operating parameter inputs, $OP_1$-$OP_M$, that are electrically connected to corresponding operating parameter sensors included within the electro-hydraulic control system 24 via corresponding signal paths $26_1$-$26_M$, wherein M may be any positive integer. The one or more operating parameter sensors included within the electro-hydraulic control system 24, examples of which will be described hereinafter, produce corresponding operating parameter signals on the signal paths $26_1$-$26_M$, which are received by the transmission control circuit 30. The transmission 14 further illustratively includes a transmission input shaft speed sensor 33 positioned to sense a rotational speed of the transmission input shaft 18. The speed sensor 33 is electrically connected to a transmission input speed (TIS) input of the control circuit 30 via a signal path 34. The speed sensor 33 may be conventional and is configured to produce a speed signal corresponding to the rotational speed of the transmission input shaft 18. The transmission 14 further illustratively includes a temperature sensor 35 positioned to sense an operating temperature of transmission fluid circulated within the transmission 14. The temperature sensor 35 is electrically connected to a transmission fluid temperature input (TFT) of the control circuit 30 via a signal path 36. The temperature sensor 35 may be conventional and is configured to produce a temperature signal corresponding to the operating temperature of the transmission fluid circulated within the transmission 14.

The transmission 14 further includes a number, N, of electrically controllable actuators included within the electro-hydraulic control system 24 that are each electrically connected to different one of a corresponding number of actuator control outputs, $AC_1$-$AC_N$ of the transmission control circuit 30 via corresponding signal paths $28_1$-$28_N$, wherein N may be any positive integer. The one or more electrically controllable actuators included within the electro-hydraulic control system 24, examples of which will be described hereinafter, are responsive to actuator control signals produced by the transmission control circuit 30 on the corresponding signal paths $28_1$-$28_N$ to control various operational features of the transmission 14.

Illustratively, the transmission control circuit 30 is microprocessor-based, and includes a memory unit 32 having instructions stored therein that are executable by the control circuit 30 to control operation of the transmission 14 generally, and more specifically to control operation of the electro-hydraulic control system 24. It will be understood, however, that this disclosure contemplates other embodiments in which the transmission control circuit 30 is not microprocessor-based, but is configured to control operation of the transmission 14 generally and operation of the electro-hydraulic system 24 more specifically, based on one or more sets of hardwired instructions and/or software instructions stored in the memory unit 32.

Figure 3:
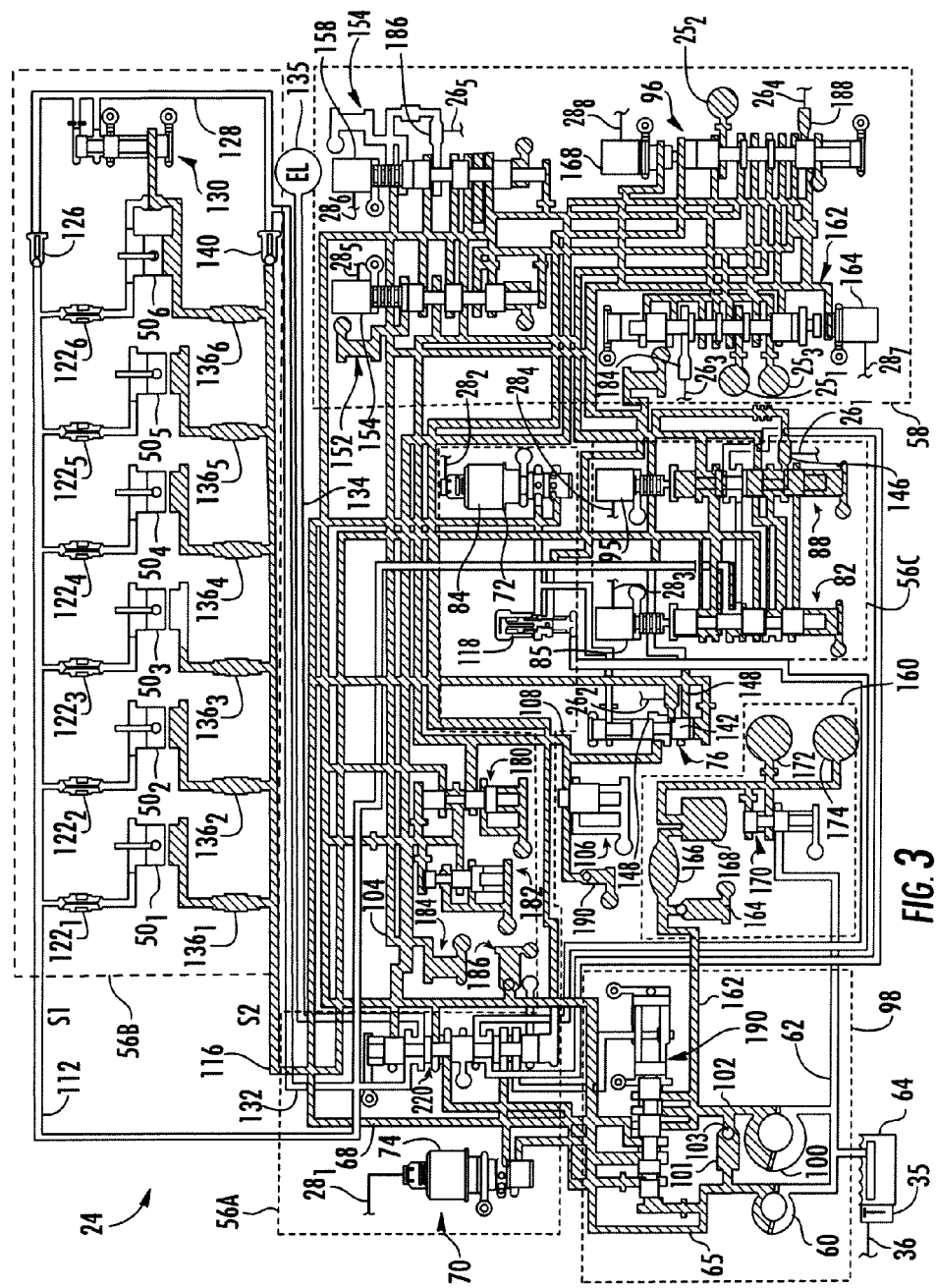
FIG. 3 is a schematic diagram of one illustrative embodiment of the electro-hydraulic control system that forms part of the toroidal traction drive motor vehicle transmission illustrated in FIG. 1.

Referring now to FIG. 3, a schematic diagram is shown of one illustrative embodiment of the electro-hydraulic control system 24 of FIG. 1. In the illustrated embodiment, the electro-hydraulic control system 24 is roughly divided into separate control sections; a variator control section 56 comprising a variator trim control sub-system 56A, a variator actuator sub-system 56B and a variator switching sub-system 56C, a clutch control section 58, and a clutch and variator pressure and fluid flow control section 98.

Referring specifically to the clutch and variator pressure and fluid flow control section 98, a conventional fluid pump 60 is configured to supply transmission fluid, e.g., conventional transmission oil, to the variator trim control section 56A, the variator switching and fault detection section 56C and to the clutch control section 58 from a source 64 of transmission fluid, e.g., a conventional transmission sump 64. In one illustrative embodiment, the fluid pump 60 is a conventional positive-displacement pump that is driven by the drive shaft 16 of the engine 12 via the input shaft 18 of the transmission 14, and is sized and configured to supply pressurized fluid from the sump 64 to a number of friction control devices, e.g., clutches, and to the variator. In the illustrated embodiment, a fluid inlet of the fluid pump 60 is fluidly coupled to the sump 64 via a fluid passageway 62. Illustratively, the temperature sensor 35 is fluidly coupled to or carried by the sump 64 such that the temperature signal produced by the sensor 35 corresponds to the temperature of transmission fluid in the sump 64, although the temperature sensor 35 may alternatively be positioned or located elsewhere relative to the transmission 14.

A fluid outlet of the pump 60 is fluidly coupled via a clutch main fluid passageway 65 to a fluid port and end of a dual pump pressure regulator valve 190, to a fluid outlet of a check ball valve 101, to a fluid inlet of a variator trim valve 70, to a fluid port of a variator pressure multiplex valve 220, to a control main fluid passageway 104 via a conventional flow reducer, to a fluid port of a conventional main pressure regulator valve 180 and a fluid inlet of a main clutch pressure relief valve 186, and to fluid ports of two trim valves 152 and 154 included in the clutch control section 58. The clutch and variator pressure and fluid flow control section 98 further includes another conventional fluid pump 100 configured to supply transmission fluid, e.g., conventional transmission oil, to the dual pump pressure regulator valve 190 and, under some operating conditions, to the fluid path 65 to thereby supplement the supply of fluid by the fluid pump 60. In one illustrative embodiment, the fluid pump 100 is a conventional positive-displacement pump that is driven by the drive shaft 16 of the engine 12 via the input shaft 18 of the transmission 14, and is sized and configured to supply pressurized fluid to a conventional transmission lubrication system. In the illustrated embodiment, a fluid inlet of the fluid pump 100 is fluidly coupled to the sump 64 via the fluid passageway 62. A fluid outlet of the pump 100 is fluidly coupled via a fluid cooler/lube fluid passageway 102 to a fluid port of the dual pump pressure regulator valve 190 and to a fluid inlet of the check ball valve 101. Under some operating conditions of the electro-hydraulic control system 24, the dual pump pressure regulator valve 190 directs fluid supplied by the fluid pump 100 to a conventional cooler and lubrication sub-system 160 of the transmission 14 via a fluid path 162. In the illustrated embodiment, the fluid path 162 is fluidly coupled to a fluid inlet of a cooler relief valve 164 and to a fluid inlet of a conventional cooler 166. A fluid outlet of the cooler 166 is fluidly coupled through a fluid filter 168 to a fluid port and end of a gear lubrication regulator valve 170 and to gear lubrication and variator lubrication passageways 172 and 174 respectively. Further details relating to the structure and operation of the clutch and variator pressure and fluid flow control section 98 generally, and to the structure and operation of the dual pump pressure regulator valve 190 in particular, will be described in detail hereinafter.

The control main fluid passageway 104 is fluidly coupled to fluid inlets and fluid ports of the control main pressure regulator valve 180 and a conventional control main pressure relief valve 182, to a fluid inlet of a conventional control main pressure accumulator valve 184, to control main inputs of actuators 154, 158, 164, 168, 85 and 87 and to fluid ports of valves 152, 154, 162, 96, 82, 88 and 76. The control main passageway 104 supplies control main fluid to the foregoing actuators and valves.

Referring now to the variator trim control sub-system 56A of the variator control section 56, a variator main fluid passageway 68 is fed, under certain operating conditions as described in detail hereinafter, by the clutch main fluid passageway 65 via the dual pump pressure regulator valve 190. The variator main fluid passageway 68 is fluidly coupled to a fluid inlet of a variator trim valve 72 and to one end of a variator fault valve 76. The variator trim valve 72 includes an actuator 84 that is electrically connected to the transmission control circuit 30 via a signal path $28_2$. Another fluid inlet of the variator trim valve 72 is fluidly coupled to exhaust, and a fluid outlet of the variator trim valve 72 is fluidly coupled to an end of the variator fault valve 76 opposite the end to which the variator main fluid passageway is coupled, and is also fluidly coupled through a conventional mode damper 118, to a fluid port of the variator pressure multiplex valve 220. Another variator trim valve 70 includes an actuator 74 that is electrically connected to the transmission control circuit 30 via a signal path $28_1$. One fluid inlet of the variator trim valve 70 is fluidly coupled to the clutch main fluid passageway 65. Another fluid inlet of the variator trim valve 70 is fluidly coupled to exhaust, and a fluid outlet of the variator trim valve 70 is fluidly coupled to another fluid port of the variator pressure multiplex valve 220. The actuators 74 and 84 are illustratively conventional electronically actuated solenoids, and the trim valves 70 and 72 are illustratively variable-bleed valves that supply variable-pressure transmission fluid based on control signals produced by the transmission control circuit 30 on the signal paths $28_1$ and $28_2$ respectively.

Under normal operating conditions, the variator pressure multiplex valve 220 routes variator main fluid from the outlet of the mode damper 118 to the variator switching sub-system 56C and routes the fluid outlet of the variator trim valve 70 to an end chamber of the dual pump pressure regulator valve 190 such that under such normal operating conditions the variator trim valve 72 controls the variator switching sub-system 56C and the fluid pressures in the clutch main fluid passageway 65 and in the endload passageway of the variator actuator control sub-system 56B are modulated by the variator trim valve 70. Under other operating conditions, e.g., during cold start and/or certain fault conditions, the variator pressure multiplex valve 220 exhausts one end chamber of the dual pump pressure regulator valve 190 such that the dual pump regulator valve 190 regulates the fluid pressure in the clutch main fluid passageway 65 (and thus the fluid pressures in the other main fluid passageways) to a constant fluid pressure, and the variator pressure multiplex valve 220 further routes fluid from the clutch main fluid passageway 65 directly to the variator switching sub-system 56C such that under such other operating conditions the variator trim valve 70 controls the variator switching sub-system 56C. Further details relating to the structure and operation of the variator trim control sub-system 56A are described in U.S. Patent Application Ser. No. 61/423,297, the disclosure of which is incorporated herein by reference in its entirety.

Referring now to the variator actuator sub-system 56B of the variator control section 56, a fluid path 112 fluidly coupled to the variator switching sub-system 56C defines a variator high-side fluid passageway, S1, and a fluid path 116 also fluidly coupled to the variator switching subsection 56C defines a variator low-side fluid passageway, S2. In the embodiment illustrated in FIG. 3, the variator includes six actuators, $50_1$-$50_6$, e.g., conventional pistons, and the variator high-side fluid passageway 112 is fluidly coupled to the high side of each such actuator $50_1$-$50_6$ via a corresponding conventional damper $122_1$-$122_6$. A conventional check valve 126 is interposed between the variator high-side fluid passageway 112 and a fluid passageway 128. The variator low-side fluid passageway 116 is fluidly coupled to the low side of each actuator $50_1$-$50_6$ via a corresponding conventional damper $136_1$-$136_6$, and another conventional check valve 140 is interposed between the variator low-side fluid passageway 116 and the fluid passageway 128. The fluid passageway 128 is fluidly coupled to an endload relief valve 130, which is further fluidly coupled between the high side and the low side of the actuator $50_6$. Further details relating to one illustrative structure and method of operating the endload relief valve 130 are provided in co-pending U.S. Patent Application Ser. No. 61/287,020, the disclosure of which is incorporated herein by reference in its entirety.

The fluid passageway 128 is further fluidly coupled to another fluid passageway 132, and an endload port or passageway 135 is fluidly coupled to another fluid passageway 134. In the state of the variator multiplex valve 220 illustrated in FIG. 3, i.e., stroked, the fluid passageway 132 is fluidly coupled via the variator pressure multiplex valve 220 to the fluid passageway 134 such that the fluid pressure within the endload port or passageway 135 is supplied by the fluid passageway 128. Generally, the fluid pressure in the endload port or passageway 135 is the pressure load on the variator disks required to keep the variator disks from slipping. Under normal operating conditions, such as illustrated in FIG. 3, the variator pressure multiplex valve 220 fluidly couples the endload port or passageway 135 directly to the fluid passageway 128 such that the fluid pressure in the endload fluid passageway 128 is modulated by the fluid pressures in S1 and S2. Under other operating conditions, e.g., cold start and certain fault conditions, the variator pressure multiplex valve 220 routes a fluid at a fixed pressure, e.g., clutch main fluid in the clutch main fluid passageway 65, to the endload fluid port or passageway 135 via the fluid passageway 134, as is described in greater detail in U.S. Patent Application Ser. 61/423,297.

A variator fault valve 76 is fluidly coupled between the variator main fluid passageway 68 at one end and the fluid outlet of the variator trim valve 72 at its opposite end. The variator fault valve 76 illustratively includes a spool 142 which is responsive to a difference in pressure between the variator main fluid passageway 68 and the fluid outlet of the variator trim valve 72 to determine whether a variator fault exists. In the embodiment illustrated in FIG. 3, for example, if the fluid pressure in the variator main fluid passageway 68 is sufficiently greater than that in the fluid outlet of the variator trim valve 72, the spool 142 is forced upwardly and thereby fluidly couples the exhaust backfill fluid passageway (EB) 108 to the fluid passageway 144. This is the position of the spool 142 illustrated in FIG. 3. If instead the fluid pressure in the fluid outlet of the variator trim valve 72 is sufficiently greater than that in the variator main fluid passageway 68, the spool 142 is forced downwardly and thereby fluidly couples the control main (COM) fluid passageway 104 to the fluid passageway 144. Illustratively, the variator fault valve 76 is designed to have a specified amount of hysteresis between the two extreme positions of the spool 142, and in one embodiment the hysteresis is approximately 15-20% such that the differential pressure between variator main fluid passageway 68 and the fluid outlet of the variator trim valve 72 must be greater than about 15-20% before the spool 142 changes position. Those skilled in the art will appreciate that this hysteresis value is provided only by way of example and that other hysteresis values, or no hysteresis value, may alternatively be used.

Referring now to the variator switching sub-system 56C of the variator control section 56, a pair of variator control valves 82 and 88 each include an actuator 85 and 95 respectively that is electrically connected to the transmission control circuit 30 via a signal path $28_3$ and $28_4$ respectively. In the illustrated embodiment, the actuators 85 and 95 are illustratively conventional electronically actuated solenoids. The actuators 85 and 95 are responsive to control signals produced by the transmission control circuit 30 on the signal paths $28_3$ and $28_4$ respectively to selectively control the valves 82 and 88 to thereby selectively supply S1 and S2 fluid pressures provided by the variator trim valve 72 under normal operating conditions, or provided by the variator trim valve 70 under other operating conditions, e.g., cold start and certain fault conditions, to the variator actuator sub-system 56B of the variator control section 56. Further details relating to the structure and operation of the variator control valves 82 and 88 are described in U.S. Patent Application Ser. No. 61/423,293, the disclosure of which is incorporated herein by reference in its entirety.

Referring now to the clutch control section 58, the clutch main fluid passageway 65 is illustratively fluidly coupled to each of a pair of clutch trim valves 150 and 152 which together define a trim system. The clutch trim valves 150 and 152 each illustratively include an actuator 154 and 158 respectively that is electrically connected to the transmission control circuit 30 via a signal path $28_5$ and $28_6$ respectively. One control fluid inlet of each of the clutch trim valves 150 and 152 is fluidly coupled to the control main fluid passageway 104, and another control fluid inlet of each clutch trim valve 150 and 152 is fluidly coupled to exhaust. In the illustrated embodiment, the actuators 154 and 158 are illustratively conventional electronically actuated solenoids. Fluid outlets of each of the clutch trim valves 150 and 152 are fluidly coupled to fluid inlets of each of a pair of clutch control valves 162 and 96. The clutch trim valves 150 and 152 are each configured to selectively, i.e., under the control of the transmission control circuit 30 via signals produced by the transmission control circuit 30 on the signal paths $28_5$ and $28_6$ respectively, fluidly couple the clutch main fluid passageway 65 to the clutch control valves 162 and 96.

The clutch control valves 162 and 96 each illustratively include an electronic actuator, e.g., an electrically controlled solenoid, 164 and 168 respectively that is electrically connected to the transmission control circuit 30 via a signal path $28_7$ and $28_8$ respectively. One control fluid inlet of each clutch control valve 162 and 96 is fluidly coupled to the control main, COM, fluid passageway 104, and another control fluid inlet is fluidly coupled to exhaust. The clutch control valve 96 is further fluidly coupled directly to the C2 clutch fluid path $25_2$, and clutch main fluid or exhaust backfill is selectively applied to the C2 clutch via the fluid path $25_2$ via various combinations of states of the actuators 154, 158, 164 and 168. The clutch control valve 162 is further fluidly coupled directly to each of the C1 and C3 clutch fluid paths $25_1$ and $25_3$, and clutch main fluid or exhaust backfill is selectively routed through the clutch control valve 162 to the C1 clutch via the fluid passageway $25_1$ or to the C3 clutch via the fluid passageway $25_3$ via various combinations of states of the actuators 154, 158, 164 and 168. The clutches C1-C3 are thus selectively activated, i.e., engaged, and deactivated, i.e., disengaged, based on the operating states of the actuators 154, 158, 164 and 168 of the clutch trim valves 150 and 152 and the clutch control valves 162 and 96 respectively, by selectively routing clutch main fluid and exhaust backpressure through the control valves 162 and 96 to the various clutches C1-C3.

Further details relating to the structure and operation of the clutch control subsection 58 are provided in co-pending U.S. Patent Application Ser. No. 61/287,031, and in co-pending U.S. Patent Application Ser. No. 61/287,038, the disclosures of which are both incorporated herein by reference in their entireties.

In the illustrated embodiment, sensors are operatively positioned relative to the variator fault valve 76, the variator control valve 88, the clutch trim valve 154 and each of the clutch control valves 162 and 96 to enable monitoring of the operating states of each of the valves 76, 88, 154, 162 and 96 and to further monitor certain transmission operating state faults. In one illustrative embodiment, such sensors are provided in the form of conventional pressure switches, although it will be understood that a conventional pressure sensor may be substituted for any one or more of the pressure switches. In the illustrated embodiment, for example, a pressure switch 146 is fluidly coupled to a fluid port of the variator control valve 88, and is electrically connected to the transmission control circuit 30 via a signal path $26_1$. Another pressure switch 148 is fluidly coupled to the fluid port 144 of the variator fault valve 76, and is electrically connected to the transmission control circuit 30 via a signal path $26_2$. Still another pressure switch 184 is fluidly coupled to a fluid port of the clutch control valve 162, and is electrically connected to the transmission control circuit 30 via a signal path $26_3$. Yet another pressure switch 188 is fluidly coupled to a fluid port of the clutch control valve 96, and is electrically connected to the transmission control circuit 30 via a signal path $26_4$. A further pressure switch 186 is fluidly coupled to a fluid port of the clutch trim valve 154, and is electrically connected to the transmission control circuit 30 via a signal path $26_5$.

Signals produced by the pressure switches 146, 148, 184, 188 and 186 are processed by the transmission control circuit 30 to allow monitoring and diagnosis by the transmission control circuit 30 of the states of these pressure switches and thus the operating states of the each of the valves 76, 88, 154, 162 and 96. For example, in the embodiment illustrated in FIG. 3, the pressure switch 148 is configured to produce a signal corresponding to the state, e.g., normal or variator fault, of the variator fault valve 76. If the fluid pressure in the variator main fluid passageway 68 is sufficiently greater than that in the fluid outlet of the variator trim valve 72 such that the spool 142 is forced upwardly and thereby fluidly couples the exhaust backfill fluid passageway (EB) 108 to the fluid passageway 144, as illustrated in FIG. 3, this corresponds to normal operation of the variator in which the pressure switch 148 produces a low or logical "0" signal. If instead the fluid pressure in the fluid outlet of the variator trim valve 72 is sufficiently greater than that in the variator main fluid passageway 68, the spool 142 is forced downwardly (not shown in the FIGS) which causes the spool 142 to fluidly couple the control main (COM) fluid passageway 104 to the fluid passageway 144. This corresponds to a variator fault conditions and the pressure switch 148 under such a variator fault condition switches to a high or logical "1" state. Thus, under normal operating conditions the pressure switch 148 produces a low or "0" signal, and under variator fault conditions the pressure switch 148 produces a high or "1" signal. The memory 32 of the transmission control circuit 30 Illustratively includes instructions stored therein that are executable by the control circuit 30 to process the signal produced by the pressure switch 148 to determine whether the variator is operating normally or whether a variator fault exists.

Further details relating to diagnosis of the signals produced by the pressure switch 146 will be described hereinafter. Further details relating to diagnosis of the signals produced by the pressure switches 184, 186 and 188 are described in co-pending U.S. Patent Application Ser. No. 61/287,031.

Referring now to FIGS. 4-8, further details relating to the structure and operation of the clutch and variator pressure and fluid flow control section 98 are illustrated. In the embodiment illustrated in FIGS. 4-8, like reference numbers are used to identify like components of the section 98 illustrated in FIG. 3. However, for ease of illustration and facilitation of understanding of the section 98, some of the connections of various fluid passageways are not shown and/or are truncated, and some of the sub-systems fluidly coupled to the clutch and variator pressure and fluid flow control section 98 are shown in block form. For example, in FIGS. 4-8 the clutch main fluid passageway 65 is shown fluidly connected to one end of the dual pump pressure regulator valve 190 via a fluid passageway 203 and through a conventional flow reducer, to the variator pressure multi-plex valve 220 (VPM) represented in block form, to the variator switching sub-system 56C also represented in block form and to the clutch control section 58 also represented in block form, and is also fluidly coupled to the dual pump pressure regulator valve 190 via a fluid passageway 222 through a conventional flow reducer and a fluid passageway 224, and is fluidly connected to a fluid inlet of the variator trim valve 70 via a fluid passageway 226. Fluid connections and/or couplings between the clutch main fluid passageway 65 and other devices and/or sections and/or subsystems illustrated in FIG. 3 are omitted from FIGS. 4-8. Further, the various components of the lubrication and cooling subsystem 160 illustrated in FIG. 3 are shown in FIGS. 4-8 as a single block 160.

The dual pump pressure regulator valve 190 includes a spool 200 that axially translates under pressure within the valve 190, e.g., within a conventional valve housing (not shown). The spool 200 defines a number of lands 204, 206, 208, 210 and 212 consecutively and sequentially positioned along the spool 200 from one end 202 to an opposite end 214. The end of the valve 190 in which the end 202 of the spool 200 translates is fluidly coupled via a conventional flow reducer to the clutch main fluid passageway 65 by the fluid passageway 203. A spool base 216 is positioned within and at a terminal end of a spring pocket 230, and a conventional valve spring 218 engages and extends between the end 214 of the spool 200 and the spool base 216. The valve spring 218 is compressed and therefore exerts a spring bias or spring force between and against the spool base 216 and the end 214 of the spool 200. Because the position of the spool base 216 is fixed at one end of the spring pocket 230, the spool 200 is under bias of the valve spring 218 in the direction of the spool end 202. The spring pocket 230 of the dual pump pressure regulator valve 190 is further fluidly coupled to the variator pressure multiplex valve 220 via a fluid passageway 229, and the variator pressure multiplex valve 220 is fluidly coupled to a fluid outlet of the variator trim valve 70 via a fluid passageway 228. The fluid passageway 162 fluidly connected to the lubrication and cooling sub-system 160 is fluidly coupled to the dual pump pressure regulator valve 190 via two separate fluid passageways 232 and 234.

As described hereinabove, the variator trim valve 70 is illustratively a conventional variable-bleed valve that receives fluid at its fluid inlet from the clutch main fluid passageway 65 and supplies variable-pressure transmission fluid at its outlet based on a control signal produced by the transmission control circuit 30 on the signal path 28₁. The fluid outlet of the variator trim valve 70 is fluidly coupled to the variator pressure multiplex valve 220 via the fluid passageway 229. Under certain predefined operating conditions of the transmission 14, such as illustrated and will be described with respect to FIG. 8, the variator pressure multiplex valve 220 fluidly couples a fixed reference pressure to the fluid passageway 229 such that the fixed reference pressure is supplied to the spring pocket 230 of the dual pump pressure regulator valve 190 under such predefined operating conditions as will be described in greater detail hereinafter with respect to FIG. 8. However, under normal operating conditions of the transmission 14, such as illustrated and will be described with respect to FIGS. 4-7, the variator pressure multiplex valve 220 fluidly couples the fluid passageway 229 to the fluid passageway 228 such that the variable-pressure transmission fluid produced by the variator trim valve 70 at its fluid outlet is supplied to the spring pocket 230 of the dual pump pressure regulator valve 190. Under such normal operating conditions, the position of the spool 200 within the dual pump pressure regulator valve 190 is defined by the fluid pressure at the end 202 of the spool 200, the fluid pressure at the opposite end 214 of the spool 200 and the biasing force of the valve spring 218. The position of the spool 200 within the dual pump pressure regulator valve 190 under normal operating conditions of the transmission 14 is thus a function of the flow rate, and hence the pressure, of transmission fluid supplied to the clutch main fluid passageway 65, the pressure of fluid supplied by the variator trim valve 70 to the spring pocket 230 of the valve 190 and the biasing force of the valve spring 218. The fluid pressure within the clutch main fluid passageway 65 is generally variable, e.g., between approximately 200 and 800 psi, as a function of the flow rate of fluid supplied by the pump 60, and under some operating conditions the flow rate of fluid supplied by the pump 100, the pressure of fluid supplied by the variator trim valve 70 to the spring pocket 230 of the valve 190 and the biasing force of the spring 218.

Figure 4:
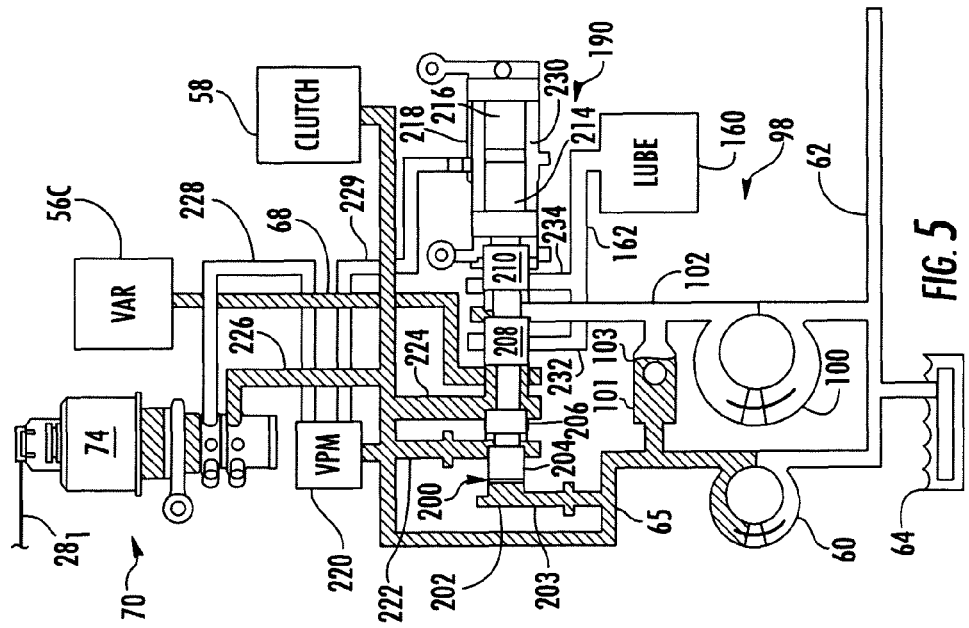
FIG. 4 is a magnified view of the clutch and variator fluid pressure and fluid flow control sub-system of the electro-hydraulic control system illustrated in FIG. 3 showing one operating state of the dual pump pressure and flow regulator valve.

Referring now specifically to FIG. 4, one operating position of the dual pump pressure regulator valve 190, i.e., one operating position of the spool 200 within the valve 190, is shown. In FIG. 4, the end 202 of the spool 200 is positioned at or adjacent to the terminal end of the fluid passageway 203. This position of the valve 190, i.e., of the spool 200 within the valve 190, is illustratively characterized by low rotational speeds of the input shaft of the transmission 14 which drives the pumps 60 and 100, high transmission operating temperatures such that the transmission fluid has low viscosity and is therefore most likely to leak through and around actuators and friction engagement devices and high transmission fluid flow demands from the clutch control section 58. Under such operating conditions, the fluid pressure supplied by the variator trim valve 70 to the spring pocket 230 of the dual pump pressure regulator valve 190 is controlled by the control circuit 30 such that the combined forces of this fluid pressure, the biasing force of the valve spring 218 and the fluid pressure applied to the end 202 of the spool 200 position the spool 200 to the fully unstroked position; i.e., with the end 202 of the spool 200 at or adjacent to the terminal end of the fluid passageway 203. In this position, the land 208 blocks the fluid passageway 68 from the fluid passageway 224 such that transmission fluid in the clutch main fluid passageway 65 is blocked from, and therefore is not supplied to, the variator control sub-system 56C. Additionally, the land 208 blocks the fluid passageway 232 from the fluid passageway 224 and the land 210 blocks the fluid passageway 234 from the fluid passageway 102 such that transmission fluid in the clutch main fluid passageway 65 is blocked from, and therefore is not supplied to, the lubrication and cooling sub-system 160 and transmission fluid in the fluid passageway 102 is blocked from, and therefore is not supplied to, the lubrication and cooling sub-system 160.

The ball check valve 101 has an inlet fluidly coupled to the fluid passageway 102 and an outlet fluidly coupled to the clutch main fluid passageway 65. The ball check valve 101 defines a pressure threshold between its fluid inlet and its fluid outlet above which the ball 103 is displaced such that the valve 101 opens and allows fluid flow from its fluid inlet through its fluid outlet. In one illustrative embodiment, this pressure threshold value is approximately 200 psi, although the valve 101 may be designed or selected to define other pressure threshold values. In any case, under operating conditions in which the lands 208 and 210 block the fluid passages 232 and 234 respectively as just described, fluid pressure within the fluid passageway 102 increases rapidly due to the operation of the pump 100 until the pressure threshold value of the check ball valve 101 is exceeded and transmission fluid supplied by the pump 100 flows through the check ball valve 101 into the clutch main fluid passageway 65. Thus, under operating conditions characterized by low transmission input speeds resulting in low transmission fluid flow through the clutch main fluid passageway 65, high transmission fluid temperature and high flow demand for transmission fluid in the clutch main fluid passageway 65, the dual pump pressure regulator valve 190 controls the fluid pressure in the spring pocket 230 of the valve 190 to position the spool 200 to block the flow of transmission fluid to the variator control sub-system 56C and to the lubrication and cooling system 160, and the check ball valve 101 is opened as a result of the pressure difference between the fluid passageways 102 and 65 exceeding the pressure threshold value of the valve 101, as illustrated in FIG. 4, such that the pumps 60 and 100 together supply transmission fluid via the clutch main fluid passageway 65 only to the clutch control section 58 of the electro-hydraulic control system 24.

The memory 32 of the control circuit 30 illustratively has instructions stored therein that are executable by the control circuit 30 to control operation of the variator trim valve 70 under the operating conditions just described to position the spool 200 of the dual pump pressure regulator valve 190 in the position illustrated in FIG. 4. In one embodiment, the low fluid flow condition in the clutch main fluid passageway 65 is determined by the control circuit 30 by monitoring the rotational speed of the input shaft 18 of the transmission, e.g., by monitoring the speed signal produced by the transmission input speed sensor 33 on the signal path 34, or by receiving the value of the rotational speed of the output shaft 16 of the power plant from a control circuit associated with the power plant 12, and determining whether the rotational speed of the input shaft 18 of the transmission 14 is below an emergency low speed threshold value.

Illustratively, the instructions stored in the memory 32 further include conventional instructions executable by the control circuit 30 to correlate the transmission input shaft speed value, e.g., via one or more stored tables, to a flow rate of fluid, and/or the fluid pressure, within the fluid passageway 65. Such instructions may further illustratively include conventional instructions to include in the effect of fluid operating temperature on the correlation between the transmission input shaft speed and the flow rate and/or pressure of fluid within the fluid passageway 65, which information may be obtained from the transmission fluid temperature sensor 35. In one illustrative embodiment, the emergency low speed threshold value may be an RPM value that correlates to a corresponding emergency low speed clutch main fluid pressure of approximately 200 psi or an emergency low transmission fluid flow rate of approximately 7 gpm, although other threshold value(s) may alternatively be used.

In one embodiment, the high transmission fluid temperature condition is determined by the control circuit 30 by monitoring the temperature signal produced by the transmission fluid temperature sensor 35 on the signal path 36, and/or by estimating the temperature of the transmission fluid via one or more known temperature estimation algorithms, and determining whether the temperature of the transmission fluid is above a temperature threshold value. In one illustrative embodiment, the temperature threshold value may be approximately 120 degrees C., although other threshold value(s) may alternatively be used.

The biasing force of the spring 218 in the spring pocket 230 of the valve 190 is known and illustratively stored in the memory 32 of the control circuit 30. The instructions stored in the memory 32 of the control circuit 30 further include conventional instructions executable by the control circuit 30 to control operation of the various friction engagement devices, e.g., the clutches C1, C2 and C3 in the illustrated embodiment, and the control circuit 30 therefore has knowledge of the transmission fluid flow demand by such friction engagement devices and/or other transmission fluid controlled components and sub-systems. In one illustrative embodiment, the high transmission fluid flow demand condition is determined by the control circuit 30 by determining the current transmission fluid flow demanded by the various components of the transmission, and determining whether the current transmission fluid flow demand is above a fluid flow demand threshold. In one illustrative embodiment, the fluid flow demand threshold may be approximately 7 gpm, although other threshold value(s) may alternatively be used.

In the illustrated embodiment, the instructions stored in the memory 32 further include instructions executable by the control circuit 30 to monitor the rotational speed of the input shaft 18 of the transmission, monitor the temperature of the transmission fluid and monitor the current transmission fluid flow demand, and to modulate the control signal supplied to the actuator 74 of the variator trim valve 70 on the signal path 28₁ such that the valve 70 supplies a fluid pressure to the spring pocket 230 that positions the spool 200 in the position illustrated in FIG. 4 if the rotational speed of the transmission input shaft is below the emergency low speed threshold, the temperature of the transmission fluid is above the temperature threshold and the transmission fluid flow demand is above the fluid flow demand threshold. The fluid pressure required to be supplied by the variator trim valve 70 to the spring pocket 230 of the dual pump pressure regulator valve 190 to position the spool 200 in the position illustrated in FIG. 4 is a conventional function of the current fluid pressure in the clutch main fluid passageway 65, which is determined from the current rotational speed of the input shaft 18 of the transmission 14 as described hereinabove, the biasing force of the valve spring 218, which is known and stored in the memory 32, and the area of the end face 202 of the spool 200, which is also known and can be stored in the memory 32. The instructions stored in the memory 32 thus further include instructions executable by the control circuit 30 to control the spool 200 to the position illustrated in FIG. 4, under appropriate operating conditions of the transmission 14 as just described, by computing the fluid pressure required to be supplied to the spring pocket 230 of the valve 190 to position the spool 200 in the position illustrated in FIG. 4 as a function of the fluid pressure in the clutch main fluid passageway 65, the biasing force of the valve spring 218 and the area of the end 202 of the spool 200, computing the control signal required to be applied to the actuator 74 to cause the variator trim valve 70 to supply the computed fluid pressure to the spring pocket 230 of the valve 190, and supplying the computed control signal to the actuator 74 via the signal path 28₁. Illustratively, the instructions stored in the memory 32 may further include instructions executable by the control circuit 30 to maintain the dual pump pressure regulator valve 190 in the position illustrated in FIG. 4 for only a predefined time period, after which the control circuit 30 is operable to move the spool 200 to a position in which fluid is supplied, at least temporarily, to the variator switching sub-system 56C and/or to the lubrication and cooling fluid sub-system 160.

Figure 5:
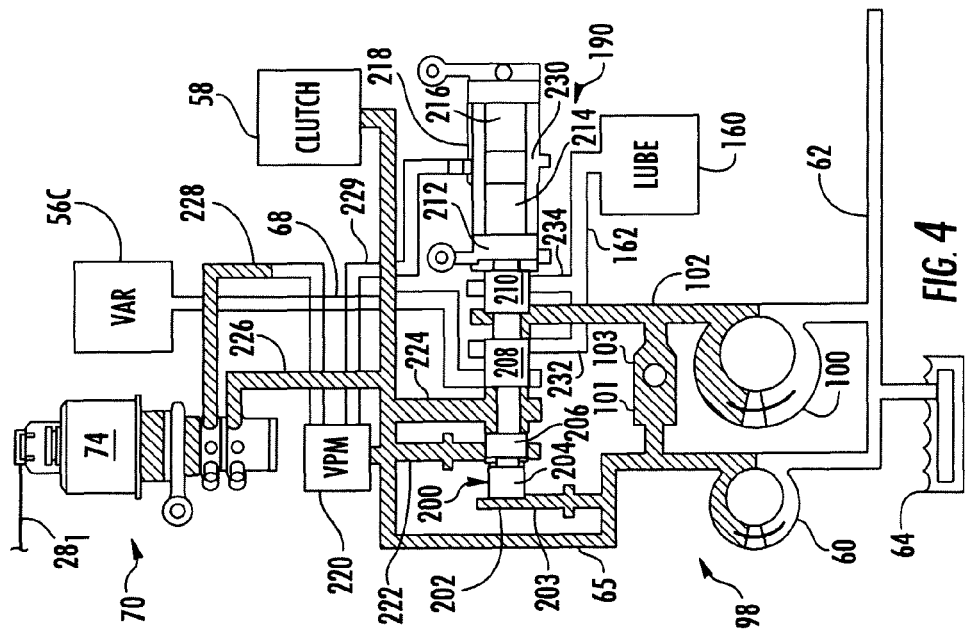
FIG. 5 is a view similar to that of FIG. 4 showing another operating state of the dual pump pressure and flow regulator valve.

Referring now to FIG. 5, another operating position of the dual pump pressure regulator valve 190, i.e., another operating position of the spool 200 within the valve 190, is shown. In FIG. 5, the end 202 of the spool 200 is positioned away from the terminal end of the fluid passageway 203, i.e., to the right of the terminal end of the fluid passageway 203 in FIG. 5. This position of the valve 190, i.e., of the spool 200 within the valve 190, is illustratively characterized by the same operating conditions just described with respect to FIG. 4 except that the rotational speed of the input shaft of the transmission 14 is greater than the emergency low speed threshold but less than another low speed threshold that is greater than the emergency low speed threshold.

Under such operating conditions characterized by low transmission fluid flow through the clutch main fluid passageway 65 resulting from the rotational speed of the transmission input shaft 18 being greater than the emergency low speed threshold but less than another low speed threshold, high transmission fluid temperature and high flow demand for transmission fluid in the clutch main fluid passageway 65, the fluid pressure supplied by the variator trim valve 70 to the spring pocket 230 of the dual pump pressure regulator valve 190 is controlled by the control circuit 30 such that the combined forces of this fluid pressure, the biasing force of the valve spring 218 and the fluid pressure applied to the end 202 of the spool 200 position the spool 200 to the position illustrated in FIG. 5 with the end 202 of the spool 200 moved away from the terminal end of the fluid passageway 203. In this position, the land 208 moves past the fluid passageway 68 such that the fluid passageway 224 fluidly connects the clutch main fluid passageway 65 to the variator main fluid passageway 68 so that transmission fluid in the clutch main fluid passageway 65 is supplied to the variator control sub-system 56C. In the position of the spool 200 illustrated in FIG. 5, however, the land 208 continues to block the fluid passageway 232 from the fluid passageway 224 and the land 210 continues to block the fluid passageway 234 from the fluid passageway 102 such that transmission fluid in the clutch main fluid passageway 65 is blocked from, and therefore is not supplied to, the lubrication and cooling sub-system 160 and transmission fluid in the fluid passageway 102 is blocked from, and therefore is not supplied to, the lubrication and cooling sub-system 160.

Because the lands 208 and 210 continue to block the fluid passages 232 and 234 respectively as just described, the difference in fluid pressure within the fluid passageways 102 and 65 will again exceed the pressure threshold value of the check ball valve 101, and transmission fluid supplied by the pump 100 therefore flows through the check ball valve 101 into the clutch main fluid passageway 65 as described hereinabove with respect to FIG. 4. Thus, under operating conditions characterized by transmission input speeds between the emergency low speed threshold and another low speed threshold that is greater than the emergency low speed threshold that results in low transmission fluid flow, but greater than that described with respect to FIG. 4, through the clutch main fluid passageway 65, high transmission fluid temperature and high flow demand for transmission fluid in the clutch main fluid passageway 65, the dual pump pressure regulator valve 190 blocks the flow of transmission fluid to the lubrication and cooling system 160 but allows transmission fluid flow to the variator switching sub-system 56C, and the check ball valve 101 is opened as a result of the pressure difference between the fluid passageways 102 and 65, such that the pumps 60 and 100 together supply transmission fluid via the clutch main fluid passageway 65 to the clutch control section 58 and also to the variator switching sub-system 56C of the electro-hydraulic control system 24.

Control of the dual pump pressure regulator valve 190 by the control circuit 30 to the position illustrated in FIG. 5 illustratively occurs as described hereinabove with respect to FIG. 4 except that rather than comparing the current transmission input speed to the emergency low speed threshold the control circuit 30 compares the current transmission input sped to the emergency low speed threshold and another low speed threshold and controls the spool 200 to the position illustrated in FIG. 5 only if the current transmission input speed is between these two low speed thresholds. Thus, in the illustrated embodiment, the instructions stored in the memory 32 further include instructions executable by the control circuit 30 to monitor the rotational speed of the input shaft 18 of the transmission, monitor the temperature of the transmission fluid and monitor the current transmission fluid flow demand, and to modulate the control signal supplied to the actuator 74 of the variator trim valve 70 on the signal path 281 such that the valve 70 supplies a fluid pressure to the spring pocket 230 that positions the spool 200 in the position illustrated in FIG. 5 if the rotational speed of the transmission input shaft is greater than the emergency low speed threshold but less than another low speed threshold that is greater than the emergency low speed threshold, the temperature of the transmission fluid is above the temperature threshold and the transmission fluid flow demand is above the fluid flow demand threshold. The fluid pressure required to be supplied by the variator trim valve 70 to the spring pocket 230 of the dual pump pressure regulator valve 190 to position the spool 200 in the position illustrated in FIG. 5 is as described hereinabove with respect to FIG. 4. Illustratively, the instructions stored in the memory 32 may further include instructions executable by the control circuit 30 to maintain the dual pump pressure regulator valve 190 in the position illustrated in FIG. 5 for only a predefined time period, after which the control circuit 30 is operable to move the spool 200 to a position in which fluid is supplied, at least temporarily, to the lubrication and cooling fluid sub-system 160.

Figure 6:
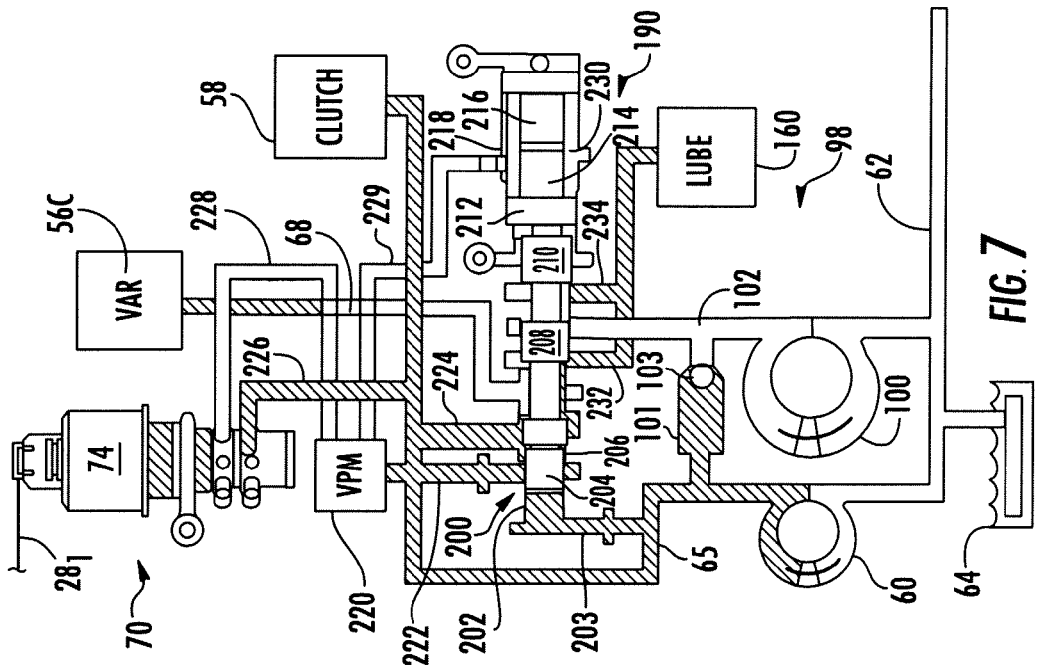
FIG. 6 is another view similar to that of FIG. 4 showing yet another operating state of the dual pump pressure and flow regulator valve.

Referring now to FIG. 6, yet another operating position of the dual pump pressure regulator valve 190, i.e., another operating position of the spool 200 within the valve 190, is shown. In FIG. 6, the end 202 of the spool 200 is positioned further away from the terminal end of the fluid passageway 203, i.e., to the further to the right of the terminal end of the fluid passageway 203 such that the position of the end 202 of the valve in FIG. 5 is between that illustrated in FIGS. 4 and 6. This position of the valve 190, i.e., of the spool 200 within the valve 190, is illustratively characterized by an adequate flow of transmission fluid through the clutch main fluid passageway 65 resulting from rotational speed of the input shaft 18 of the transmission greater than the low speed threshold used as the upper threshold to position the spool 200 as shown in FIG. 5 and transmission fluid temperature that is less than the temperature threshold value.

Under such operating conditions characterized by adequate transmission fluid flow through the clutch main fluid passageway 65 resulting from the rotational speed of the transmission input shaft 18 being greater than the low speed threshold used as the upper speed threshold for controlling the valve 190 to the position illustrated in FIG. 5 and transmission fluid temperature less than the temperature threshold value, the fluid pressure supplied by the variator trim valve 70 to the spring pocket 230 of the dual pump pressure regulator valve 190 is controlled by the control circuit 30 such that the combined force of this fluid pressure, the biasing force of the valve spring 218 and the fluid pressure applied to the end 202 of the spool 200 position the spool 200 to the position illustrated in FIG. 6 with the end 202 of the spool 200 moved further away from the terminal end of the fluid passageway 203 than that illustrated in FIG. 5. In this position, the fluid passageway 224 continues to fluidly connect the clutch main fluid passageway 65 to the variator main fluid passageway 68 so that transmission fluid in the clutch main fluid passageway 65 is supplied to the variator control sub-system 56C. The land 208 also continues to block the fluid passageway 232 from the fluid passageway 224, and transmission fluid in the clutch main fluid passageway 65 therefore continues to be blocked from, and therefore is not supplied to, the lubrication and cooling sub-system 160. However, with the spool 200 in the position illustrated in FIG. 6, the land 210 no longer blocks the fluid passageway 234 from the fluid passageway 102 such that the valve 190 fluidly connects the fluid passageway 234 to the fluid passageway 102 so transmission fluid supplied to the fluid passageway 102 by the pump 100 is supplied to the lubrication and cooling subsystem 160. Furthermore, because the land 210 no longer block the fluid passageway 234 from the fluid passageway 102, the difference in fluid pressure within the fluid passageways 102 and 65 no longer exceeds the pressure threshold value of the check ball valve 101, and the check ball 103 therefore closes the valve 101 such that transmission fluid supplied by the pump 100 does not flow through the check ball valve 101 into the clutch main fluid passageway 65. Thus, under operating conditions characterized by transmission input speeds greater than the low speed threshold and transmission fluid temperature less than the temperature threshold value, the dual pump pressure regulator valve 190 blocks the flow of transmission fluid from the clutch main fluid passageway 65 to the lubrication and cooling subsystem 160, but allows transmission fluid flow supplied only by the pump 60 to the clutch main fluid passageway 65 to flow to the clutch control section 58 and to the variator switching sub-system 56C, and further allows transmission fluid flow supplied only by the pump 100 to flow from the fluid passageway 102 to the lubrication and cooling subsystem 160.

Control of the dual pump pressure regulator valve 190 by the control circuit 30 to the position illustrated in FIG. 6 illustratively occurs as described hereinabove with respect to FIGS. 4 and 5 except that the spool 200 is controlled by the control circuit 30 to the position illustrated in FIG. 6 only when the current transmission input speed is greater than the low speed threshold that was used as the upper speed threshold when controlling the spool to the position illustrated in FIG. 5 and the temperature of the transmission fluid is less than the temperature threshold value. Thus, in the illustrated embodiment, the instructions stored in the memory 32 further include instructions executable by the control circuit 30 to monitor the rotational speed of the input shaft 18 of the transmission and monitor the temperature of the transmission fluid, and to modulate the control signal supplied to the actuator 74 of the variator trim valve 70 on the signal path 281 such that the valve 70 supplies a fluid pressure to the spring pocket 230 that positions the spool 200 in the position illustrated in FIG. 6 if the rotational speed of the transmission input shaft is greater than the low speed threshold that is greater than the emergency low speed threshold and the temperature of the transmission fluid is less than the temperature threshold. The fluid pressure required to be supplied by the variator trim valve 70 to the spring pocket 230 of the dual pump pressure regulator valve 190 to position the spool 200 in the position illustrated in FIG. 6 is as described hereinabove with respect to FIG. 4.

Figure 7:
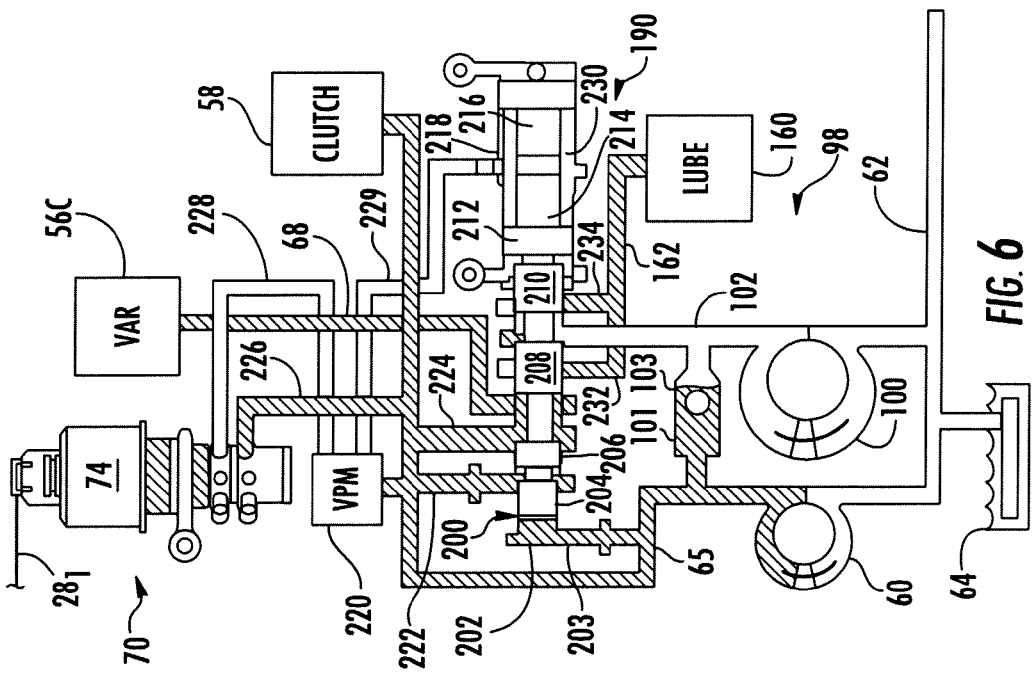
FIG. 7 is yet another view similar to that of FIG. 4 showing still another operating state of the dual pump pressure and flow regulator valve.

Referring now to FIG. 7, still another operating position of the dual pump pressure regulator valve 190, i.e., another operating position of the spool 200 within the valve 190, is shown. In FIG. 7, the end 202 of the spool 200 is positioned still further away from the terminal end of the fluid passageway 203, i.e., to the further to the right of the terminal end of the fluid passageway 203 such that the position of the end 202 of the valve in FIG. 6 is between that illustrated in FIGS. 5 and 7. This position of the valve 190, i.e., of the spool 200 within the valve 190, is illustratively characterized by high cooling demand during otherwise high or adequate flow of transmission fluid through the clutch main fluid passageway 65, which results from rotational speed of the input shaft 18 of the transmission greater than the low speed threshold used as the upper threshold to position the spool 200 as shown in FIG. 5 and transmission fluid temperature that is greater than the temperature threshold value.

Under such operating conditions, the fluid pressure supplied by the variator trim valve 70 to the spring pocket 230 of the dual pump pressure regulator valve 190 is controlled by the control circuit 30 such that the combined force of this fluid pressure, the biasing force of the valve spring 218 and the fluid pressure applied to the end 202 of the spool 200 position the spool 200 to the position illustrated in FIG. 7 with the end 202 of the spool 200 moved further away from the terminal end of the fluid passageway 203 than that illustrated in FIG. 6. In this position, the fluid passageway 224 continues to fluidly connect the clutch main fluid passageway 65 to the clutch control section 58 and to the variator main fluid passageway 68 so that transmission fluid in the clutch main fluid passageway 65 is supplied to the clutch control section 58 and to the variator control sub-system 56C. The fluid passageway 234 likewise continues to be fluidly connected to the fluid passageway 102 so that transmission fluid supplied by the pump 100 to the fluid passageway 102 continues to be supplied to the lubrication and cooling sub-system 160. However, with the spool 200 in the position illustrated in FIG. 6, the land 208 no longer blocks the fluid passageway 224 from the fluid passageway 234 such that the valve 190 fluidly connects the fluid passageway 234 to the fluid passageway 224 so transmission fluid supplied to the control main fluid passageway 65 by the pump 60 is supplied to the lubrication and cooling sub-system 160 to supplement the flow of transmission fluid supplied to the lubrication and cooling sub-system 160 by the pump 100. The check ball valve 101 remains closed in the position of the spool 200 illustrated in FIG. 7 such that transmission fluid supplied by the pump 100 does not flow through the check ball valve 101 into the clutch main fluid passageway 65. Thus, under operating conditions characterized by transmission input speeds greater than the low speed threshold and transmission fluid temperature greater than the temperature threshold value, the dual pump pressure regulator valve 190 allows transmission fluid flow supplied only by the pump 60 to the clutch main fluid passageway 65 to flow to the clutch control section 58, the variator switching sub-system 56C and the lubrication and cooling sub-system 160, and further allows transmission fluid flow supplied only by the pump 100 to flow from the fluid passageway 102 to the lubrication and cooling sub-system 160.

Control of the dual pump pressure regulator valve 190 by the control circuit 30 to the position illustrated in FIG. 7 illustratively occurs as described hereinabove with respect to FIGS. 4-6 except that the spool 200 is controlled by the control circuit 30 to the position illustrated in FIG. 7 only when the current transmission input speed is greater than the low speed threshold that was used as the upper speed threshold when controlling the spool to the position illustrated in FIG. 5 and the temperature of the transmission fluid is greater than the temperature threshold value. Thus, in the illustrated embodiment, the instructions stored in the memory 32 further include instructions executable by the control circuit 30 to monitor the rotational speed of the input shaft 18 of the transmission and monitor the temperature of the transmission fluid, and to modulate the control signal supplied to the actuator 74 of the variator trim valve 70 on the signal path 281 such that the valve 70 supplies a fluid pressure to the spring pocket 230 that positions the spool 200 in the position illustrated in FIG. 7 if the rotational speed of the transmission input shaft is greater than the low speed threshold that is greater than the emergency low speed threshold and the temperature of the transmission fluid is greater than the temperature threshold. The fluid pressure required to be supplied by the variator trim valve 70 to the spring pocket 230 of the dual pump pressure regulator valve 190 to position the spool 200 in the position illustrated in FIG. 7 is as described hereinabove with respect to FIG. 4.

Figure 8:
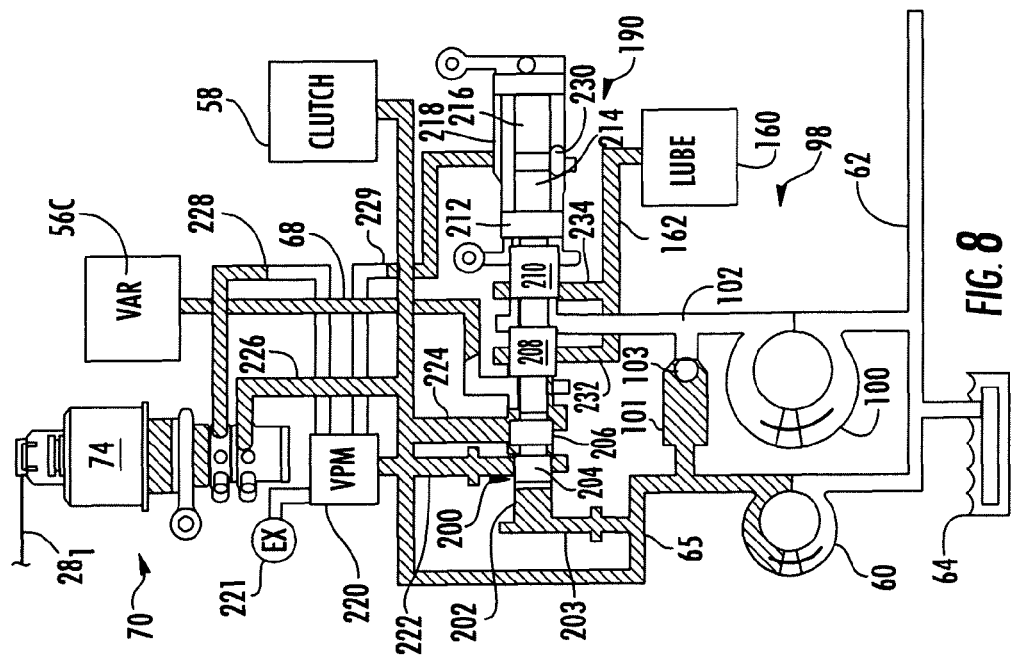
FIG. 8 is still another view similar to that of FIG. 4 showing a further operating state of the dual pump pressure and flow regulator valve.

Referring now to FIG. 8, another operating state of the dual pump pressure regulator valve 190 is shown. In the operating state illustrated in FIG. 8, the variator pressure multiplex valve 220 operates to fluidly couple a fixed reference pressure, rather than the variable-pressure fluid outlet of the variator trim valve 70 as in the case of FIGS. 4-7, to the fluid passageway 229 such that the fixed reference pressure is supplied to the spring pocket 230 of the dual pump pressure regulator valve 190 under at least one predefined operating condition. In the embodiment illustrated in FIG. 8, the variator pressure multiplex valve 221 is fluidly coupled via a fluid passageway 221 to exhaust (EX), and in this embodiment the variator pressure multiplex valve 220 is operable under the at least one predefined operating condition to fluidly couple the fluid passageway 229 to the fluid passageway 221 to thereby exhaust the spring pocket 230 of the dual pump pressure regulator valve 190. In this case, the fluid pressure in the clutch main fluid passageway 65 is a constant-valued fluid pressure, e.g., 400 psi, and since the spring pocket 230 of the dual pump pressure regulator valve 190 is exhausted is a function of the biasing force of the spring 218 and of the area of the face of the spool 200 at the end 202 thereof. In alternative embodiments, the variator pressure multiplex valve 221 may be fluidly coupled via one or more fluid passageways to one or more other constant-valued, positive reference pressures, and in such embodiments the variator pressure multiplex valve 220 may be operable under the at least one predefined operating condition to fluidly couple the fluid passageway 229 to at least one such fluid passageway to thereby supply a constant-valued, positive reference pressure to the spring pocket 230 of the dual pump pressure regulator valve 190. In such cases, the constant-valued, positive fluid pressure in the clutch main fluid passageway 65 is a function of the value of the reference pressure supplied to the spring pocket 230 of the valve 190, the biasing force of the spring 218 and of the area of the face of the spool 200 at the end 202 thereof.

In one illustrative embodiment, the at least one predefined operating condition under which the variator multiplex valve 220 fluidly couples the fixed reference pressure to the spring pocket 230 of the dual pump pressure regulator valve 190 includes one or more fault conditions associated with the transmission 14. Alternatively or additionally, the at least one predefined operating condition may include cold start conditions, e.g., cold operation of the transmission 14 prior to warming up as a result of operation to at least a minimum operating temperature. Those skilled in the art will recognize one or more other operating conditions under which the variator multiplex valve 220 may fluidly coupled the fixed reference pressure to the spring pocket 230 of the dual pump pressure regulator valve 190, and any such one or more other operating conditions are contemplated by this disclosure. In any case, the variator pressure multiplex valve 220 is operable, under control of the control circuit 30, to selectively couple the fluid passageway 228 to the fluid passageway 229 under "normal" operating conditions, or to selectively couple the fluid passageway 229 to the reference pressure, e.g., exhaust, under the at least one predefined operating condition, e.g., fault and/or cold start conditions. Further details relating to such control of the variator pressure multiplex valve 220 are described in U.S. Patent Application Ser. No. 61/423,297.

When the dual pump pressure regulator valve 190 is controlled as just described by supplying a constant-valued reference pressure to the spring pocket 230, the spool 200 is illustratively positioned as described with respect to FIG. 6, i.e., with the fluid passageway 224 fluid coupled to the fluid passageway 68 such that fluid in the clutch main fluid passageway 65 is supplied to the clutch control section 58 and to the variator switching sub-system 56C, and with the fluid passageway 234 fluidly coupled to the fluid passageway 162 such that fluid supplied by the pump 100 is supplied to the lubrication and cooling sub-system 160. The land 208 blocks the fluid passageway 232 from the fluid passageway 224 such that fluid in the clutch main fluid passageway 65 is not supplied to the lubrication and cooling sub-system 160, and the check ball valve 101 is closed such that fluid supplied by the pump 100 is supplied only to the lubrication and cooling sub-system 160. In this embodiment, the biasing force of the spring 218 and the area of the face of the end 202 of the spool 200 are selected such that the spool 200 is positioned as illustrated in FIG. 8 when the constant-valued reference pressure, e.g., exhaust, is supplied to the spring pocket 230.

Figure 9:
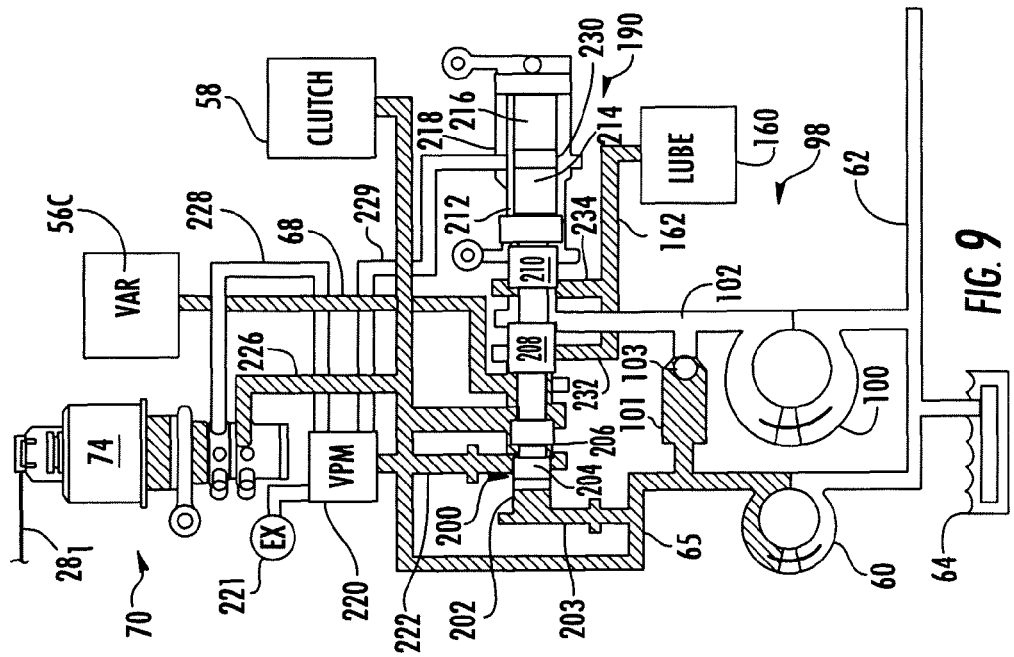
FIG. 9 is another view similar to that of FIG. 4 showing the clutch and variator fluid pressure and fluid flow control sub-system of FIGS. 4-8 implemented in an automatic transmission in which a conventional torque converter replaces the variator illustrated in FIGS. 1-3.

It will be understood that the concepts illustrated and described herein with reference to FIGS. 4-8 apply not only to automatic transmissions which include a variator, but to other types of motor vehicle transmissions. Referring now to FIG. 9, for example, one alternative transmission embodiment is shown in which a fluid flow control section 240 is implemented. In the illustrated embodiment, the motor vehicle transmission is a conventional motor vehicle transmission that includes a conventional integral or attached torque converter 250 rather than a variator. The fluid flow control section 240 is otherwise identical to the fluid flow control section 98 illustrated and descried with respect to FIGS. 3-8, and like reference numbers are therefore used in FIG. 9 to represent like components. In this embodiment, the dual pump pressure regulator valve 190 may be controlled as described hereinabove with respect to FIGS. 4-8 to control fluid flow to the clutch control section 58, the torque converter 250 and the lubrication and cooling sub-system 160.

Figure 10:
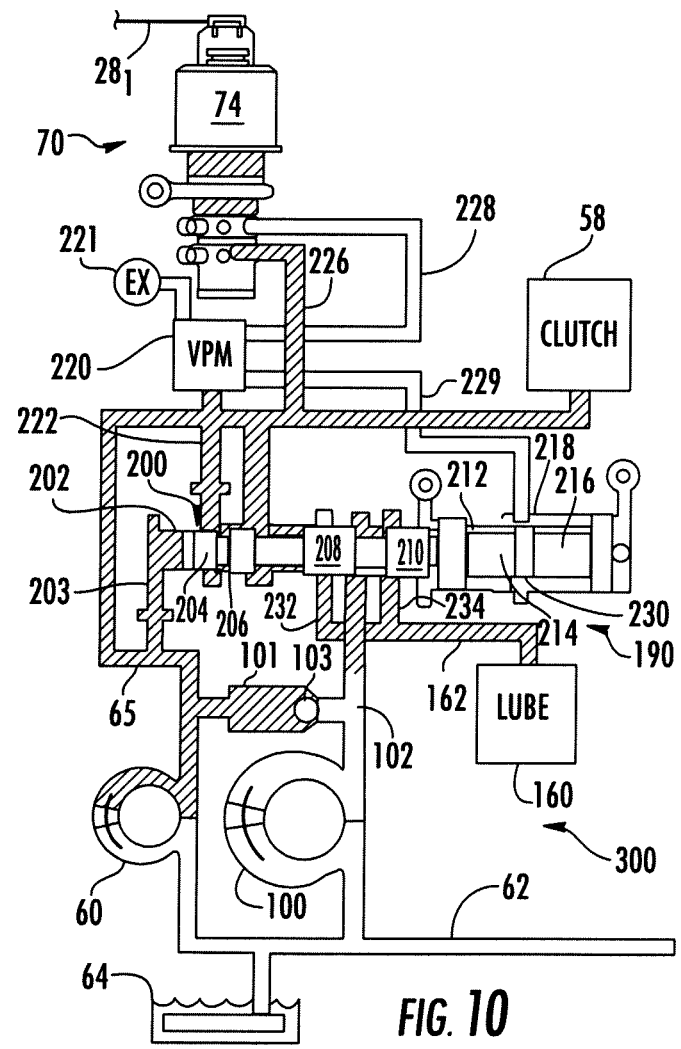
FIG. 10 is yet another view similar to that of FIG. 4 showing the clutch and variator fluid pressure and fluid flow control sub-system of FIGS. 4-8 implemented in a conventional automatic transmission in which the variator illustrated in FIGS. 1-3 is omitted.

Referring now to FIG. 10, another example is shown of a further type of motor vehicle transmission in which the concepts illustrated and described herein may apply. In the embodiment illustrated in FIG. 10, the motor vehicle transmission is a conventional motor vehicle transmission that includes only a clutch control section 58 and a lubrication and cooling sub-system 160, and in which a fluid flow control section 300 is implemented. In the illustrated embodiment, the fluid passageway 68 coupled to the dual pump pressure regulator valve 190 is omitted. The fluid flow control section 300 is otherwise identical to the fluid flow control section 98 illustrated and descried with respect to FIGS. 3-8, and like reference numbers are therefore used in FIG. 10 to represent like components. In this embodiment, the dual pump pressure regulator valve 190 may be controlled as described hereinabove with respect to FIGS. 4 and 6-8 to control fluid flow to the clutch control section 58 and the lubrication and cooling sub-system 98.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

The invention claimed is:

1. An apparatus for controlling fluid flow in a motor vehicle transmission including at least one friction engagement device, a fluid-using sub-system separate from and in addition to the at least one friction engagement device and a lubrication and cooling sub-system, the apparatus comprising:
   a first pump driven by an input shaft of the transmission to supply fluid from a source of fluid to the at least one friction engagement device via a first fluid passageway,
   a second pump driven by the input shaft of the transmission to supply fluid from the source of fluid to a second fluid passageway, and
   a valve fluidly coupled to the first and second fluid passageways, to the fluid-using sub-system, and to the lubrication and cooling sub-system, the valve fluidly coupling the first fluid passageway to the fluid-using sub-system and fluidly coupling the second fluid passageway to the lubrication and cooling sub-system when (i) a flow rate of the fluid in the first fluid passageway is greater than a threshold fluid flow rate and (ii) a temperature of the fluid is less than a temperature threshold, wherein only the first pump supplies fluid to the at least one friction engagement device and to the fluid-using sub-system via the first fluid passageway and wherein only the second fluid pump supplies fluid to the lubrication and cooling sub-system via the second fluid passageway.

2. The apparatus of claim 1, wherein the valve comprises a spool having one end in fluid communication with the first fluid passageway and an opposite end positioned in a spring pocket under bias of a spring in the direction of the one end, the spring pocket receiving fluid at a controlled pressure,
   and wherein a position of the spool within the valve is a function of the fluid pressure in the first passageway, the controlled pressure of the fluid in the spring pocket and a biasing force of the spring.

3. The apparatus of claim 2, further comprising a trim valve having a fluid inlet fluidly coupled to the first fluid passageway and a fluid outlet fluidly coupled to the spring pocket of the valve, the trim valve responsive to a control signal to supply fluid at the controlled pressure to the spring pocket of the valve.

4. The apparatus of claim 3, further comprising a control circuit including a memory having instructions stored therein executable by the control circuit to produce the control signal.

5. The apparatus of claim 4, further comprising means for determining a rotational speed of the input shaft of the transmission,
   wherein the memory has a low speed threshold stored therein that is correlated with the threshold fluid flow rate,
   and wherein the instructions stored in the memory include instructions executable by the control circuit to determine whether the flow rate of the fluid in the first fluid passageway is greater than a threshold fluid flow rate by determining whether the rotational speed of the input shaft of the transmission is greater than the low speed threshold.

6. The apparatus of claim 5, further comprising means for determining a temperature of the fluid supplied by the first and second pumps and producing a corresponding temperature value,
   wherein the temperature threshold is stored in the memory,
   and wherein the instructions stored in the memory include instructions executable by the control circuit to produce the control signal if the rotational speed of the input shaft of the transmission is greater than the low speed threshold and the temperature value is less than the threshold temperature.

7. The apparatus of claim 4, wherein the instructions stored in the memory include instructions executable by the control circuit to modulate the control signal as a function of the fluid pressure in the first passageway and the biasing force of the spring such that the fluid pressure supplied by the trim valve to the spring pocket controls the spool to a position in which the valve fluidly couples only the first fluid passageway to the fluid-using sub-system and fluidly couples only the second fluid passageway to the lubrication and cooling sub-system such that fluid is supplied only by the first fluid pump to the at least one friction engagement device and to the fluid-using sub-system and fluid is supplied only by the second fluid pump to the lubrication and cooling sub-system.

8. The apparatus of claim 1, wherein the fluid-using sub-system comprises one of a torque converter and a variator.

9. An apparatus for controlling fluid flow in a motor vehicle transmission including at least one friction engagement device and a lubrication and cooling sub-system, the apparatus comprising:
   a first pump driven by an input shaft of the transmission to supply fluid from a source of fluid to the at least one friction engagement device via a first fluid passageway,
   a second pump driven by the input shaft of the transmission to supply fluid from the source of fluid to a second fluid passageway, and
   a valve fluidly coupled to the first and second fluid passageways and to the lubrication and cooling sub-system, the valve fluidly coupling the first fluid passageway to the lubrication and cooling sub-system when (i) a flow rate of the fluid in the first fluid passageway is greater than a threshold fluid flow rate and (ii) a temperature of the fluid is greater than a temperature threshold, wherein the first pump supplies fluid to the at least one friction engagement device and to the lubrication and cooling sub-system via the first fluid passageway and wherein the second fluid pump supplies fluid to the lubrication and cooling sub-system via the second fluid passageway.

10. The apparatus of claim 9, wherein the valve comprises a spool having one end in fluid communication with the first fluid passageway and an opposite end positioned in a spring pocket under bias of a spring in the direction of the one end, the spring pocket receiving fluid at a controlled pressure,
    and wherein a position of the spool within the valve is a function of the fluid pressure in the first passageway, the controlled pressure of the fluid in the spring pocket and a biasing force of the spring.

11. The apparatus of claim 10, further comprising a trim valve having a fluid inlet fluidly coupled to the first fluid passageway and a fluid outlet fluidly coupled to the spring pocket of the valve, the trim valve responsive to a control signal to supply fluid at the controlled pressure to the spring pocket of the valve.

12. The apparatus of claim 11, further comprising a control circuit including a memory having instructions stored therein executable by the control circuit to produce the control signal.

13. The apparatus of claim 12, further comprising means for determining a rotational speed of the input shaft of the transmission,
- wherein the memory has a low speed threshold stored therein that is correlated with the threshold fluid flow rate,
- and wherein the instructions stored in the memory include instructions executable by the control circuit to determine whether the flow rate of the fluid in the first fluid passageway is greater than a threshold fluid flow rate by determining whether the rotational speed of the input shaft of the transmission is greater than the low speed threshold.

14. The apparatus of claim 13, further comprising means for determining a temperature of the fluid supplied by the first and second pumps and producing a corresponding temperature value,
- wherein the temperature threshold is stored in the memory,
- and wherein the instructions stored in the memory include instructions executable by the control circuit to produce the control signal if the rotational speed of the input shaft of the transmission is greater than the low speed threshold and the temperature value is greater than the threshold temperature.

15. The apparatus of claim 12, wherein the instructions stored in the memory include instructions executable by the control circuit to modulate the control signal as a function of the fluid pressure in the first passageway and the biasing force of the spring such that the fluid pressure supplied by the trim valve to the spring pocket controls the spool to a position in which the valve fluidly couples the first and second fluid passageways to the lubrication and cooling sub-system such that fluid is supplied by the first fluid pump to the at least one friction engagement device and to the lubrication and cooling sub-system and fluid is supplied by the second fluid pump to the lubrication and cooling sub-system.

16. The apparatus of claim 15, wherein the transmission further comprises another fluid-using sub-system in addition to the at least one friction engagement device and the lubrication and cooling subsystem, the another fluid-using sub-system fluidly coupled to the valve, the valve further fluidly coupling the first fluid passageway to the another fluid-using sub-system when the flow rate of the fluid in the first fluid passageway is greater than the threshold fluid flow rate and the temperature of the fluid is greater than the temperature threshold, whereby fluid is also supplied by the first pump to the another fluid-using sub-system via the first fluid passageway.

17. The apparatus of claim 16, wherein the another fluid-using sub-system comprises one of a torque converter and a variator.

18. An apparatus for controlling fluid flow in a motor vehicle transmission including at least one friction engagement device, the apparatus comprising:
- a first pump driven by an input shaft of the transmission to supply fluid from a source of fluid to the at least one friction engagement device via a first fluid passageway,
- a valve including a spool having one end in fluid communication with the first fluid passageway and an opposite end positioned in a spring pocket under bias of a spring in the direction of the one end, and
- means for selectively supplying a modulated pressure to or exhausting the spring pocket of the valve,
- wherein a position of the spool within the valve is a function of the fluid pressure in the first passageway, fluid pressure in the spring pocket and a biasing force of the spring,
- and wherein the valve regulates fluid pressure within the first fluid passageway as a function of the biasing force of the spring, the fluid pressure within the first fluid passageway and the modulated pressure when the modulated pressure is supplied to the spring pocket of the valve,
- and wherein the valve regulates fluid pressure within the first fluid passageway to a fixed fluid pressure as a function of the biasing force of the spring and of an area of the one end of the spool when the spring pocket is exhausted.

19. The apparatus of claim 18, further comprising another fluid-using sub-system in addition to but separate from the at least one friction engagement device,
- and wherein the valve selectively fluidly couples the first fluid passageway to the another fluid-using sub-system.

20. The apparatus of claim 18, wherein the transmission includes a lubrication and cooling sub-system, and further comprising a second pump driven by the input shaft of the transmission to supply fluid from the source of fluid to a second fluid passageway,
- wherein the valve selectively fluidly couples the second fluid passageway to the lubrication and cooling system.

* * * * *